United States Patent [19]

Morita

[11] Patent Number: 4,852,020
[45] Date of Patent: Jul. 25, 1989

[54] IMAGE DATA PROCESSING METHOD AND APPARATUS THEREFOR

[75] Inventor: Yoshio Morita, Kyoto, Japan

[73] Assignee: Dainippon Screen Mfg. Co., Ltd., Kyoto, Japan

[21] Appl. No.: 18,280

[22] Filed: Feb. 11, 1987

[30] Foreign Application Priority Data

Feb. 13, 1986 [JP] Japan ................... 61-030429

[51] Int. Cl.[4] .............................. G06F 15/62
[52] U.S. Cl. ................... 364/521; 340/739; 340/745; 364/900
[58] Field of Search ... 382/62; 364/521, 900 MS File, 364/200 MS File; 340/739, 745

[56] References Cited

U.S. PATENT DOCUMENTS

| 3,906,480 | 9/1975 | Schwartz et al. | 340/745 |
| 4,208,810 | 6/1980 | Rohner et al. | 364/521 |
| 4,311,998 | 1/1982 | Matherat | 340/739 |
| 4,335,380 | 6/1982 | Wright | 340/745 |
| 4,396,989 | 8/1983 | Fleming et al. | 340/739 |
| 4,414,643 | 11/1983 | Meyer | 364/900 |
| 4,490,848 | 12/1984 | Beall et al. | 382/25 |
| 4,551,768 | 11/1985 | Tsuchiya et al. | 382/56 |
| 4,620,288 | 10/1986 | Welmers | 364/518 |
| 4,635,292 | 1/1987 | Mori et al. | 364/900 |

Primary Examiner—Eddie P. Chan
Assistant Examiner—Debra A. Chun
Attorney, Agent, or Firm—Lowe, Price, LeBlanc, Becker & Shur

[57] ABSTRACT

Segments included in image patterns are supplied as vector data sorted in the subscanning direction to obtain intersection points of the segments and main scanning lines. Coordinate values of the intersection points are further sorted in the main scanning direction. There sortings are performed using a radix sorting method. Run-length data are obtained from the sorted coordinate values to perform exposure recording through scanning on a photosensitive material.

30 Claims, 31 Drawing Sheets

| INPUT SEQUENCE |
|:---:|
| 1203 |
| 8652 |
| 3921 |
| 2203 |
| 5587 |
| 4645 |
| 8200 |
| 6896 |
| 7186 |
| 1134 |
| 4321 |
| 5187 |
| 7202 |
| 8652 |
| 4645 |
| 5077 |

12

| N | VECTOR DATA |
|:---:|:---:|
| 0 | $V_2$ |
| 1 | $V_4$ |
| 2 | $V_3$ |
| 3 | $V_1$ |
| 4 | .... |

12

| N | VECTOR DATA |
|:---:|:---:|
| 0 | $V_2$ |
| 1 | $V_4$ |
| 2 | $V_3$ |
| 3 | $V_1$ |
| 4 | .... |

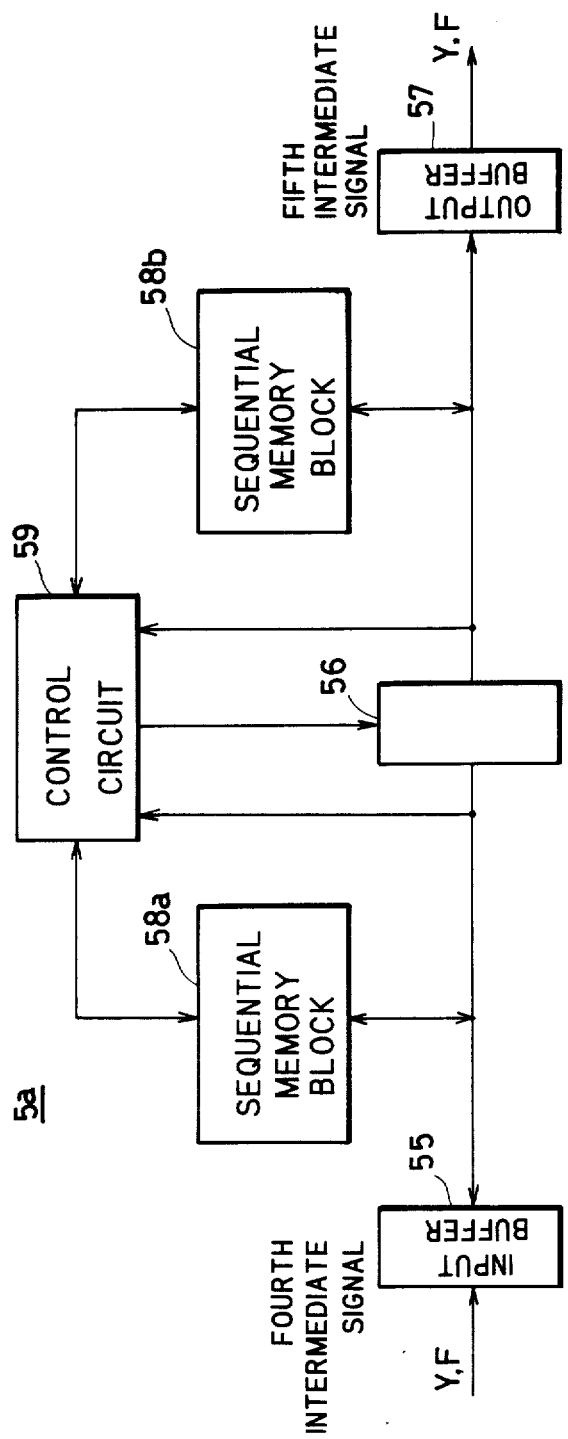

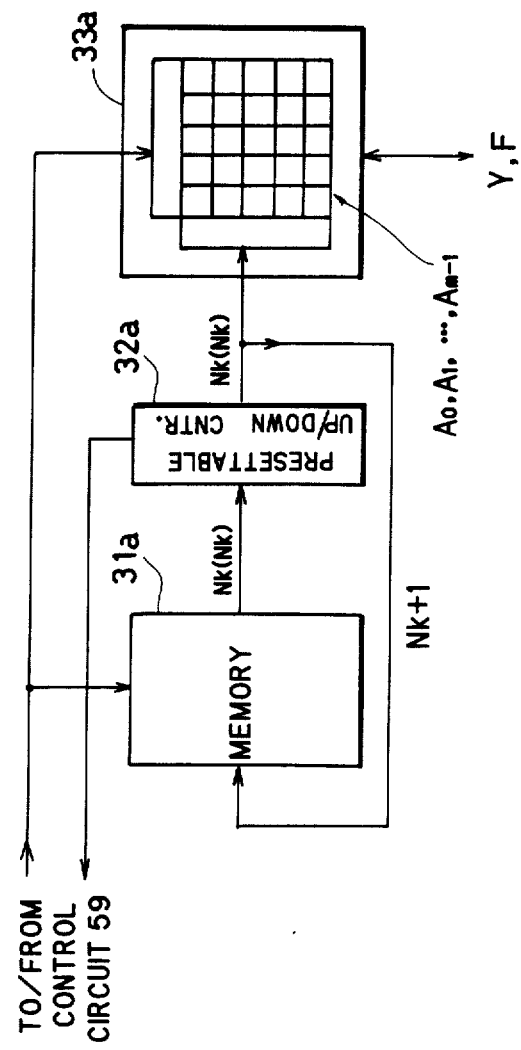

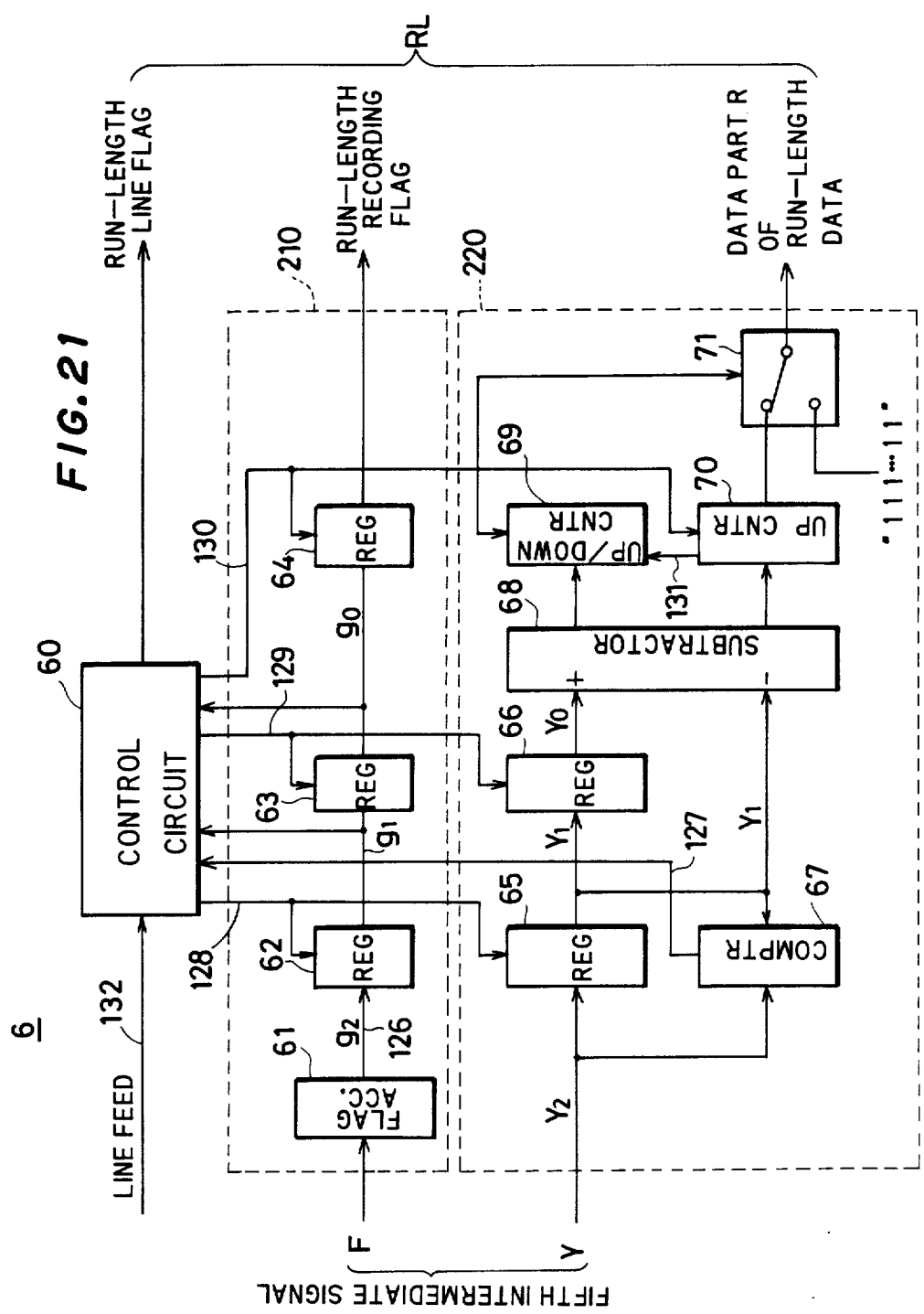

⟶ = BLACK START POINT
--▶ = BLACK END POINT (+3) 011
(+2) 010
(+1) 001
( 0) 000
(−1) 111
(−2) 110
(−3) 101

(+3) 011
(+2) 010
(+1) 001
( 0) 000
(−1) 111
(−2) 110
(−3) 101

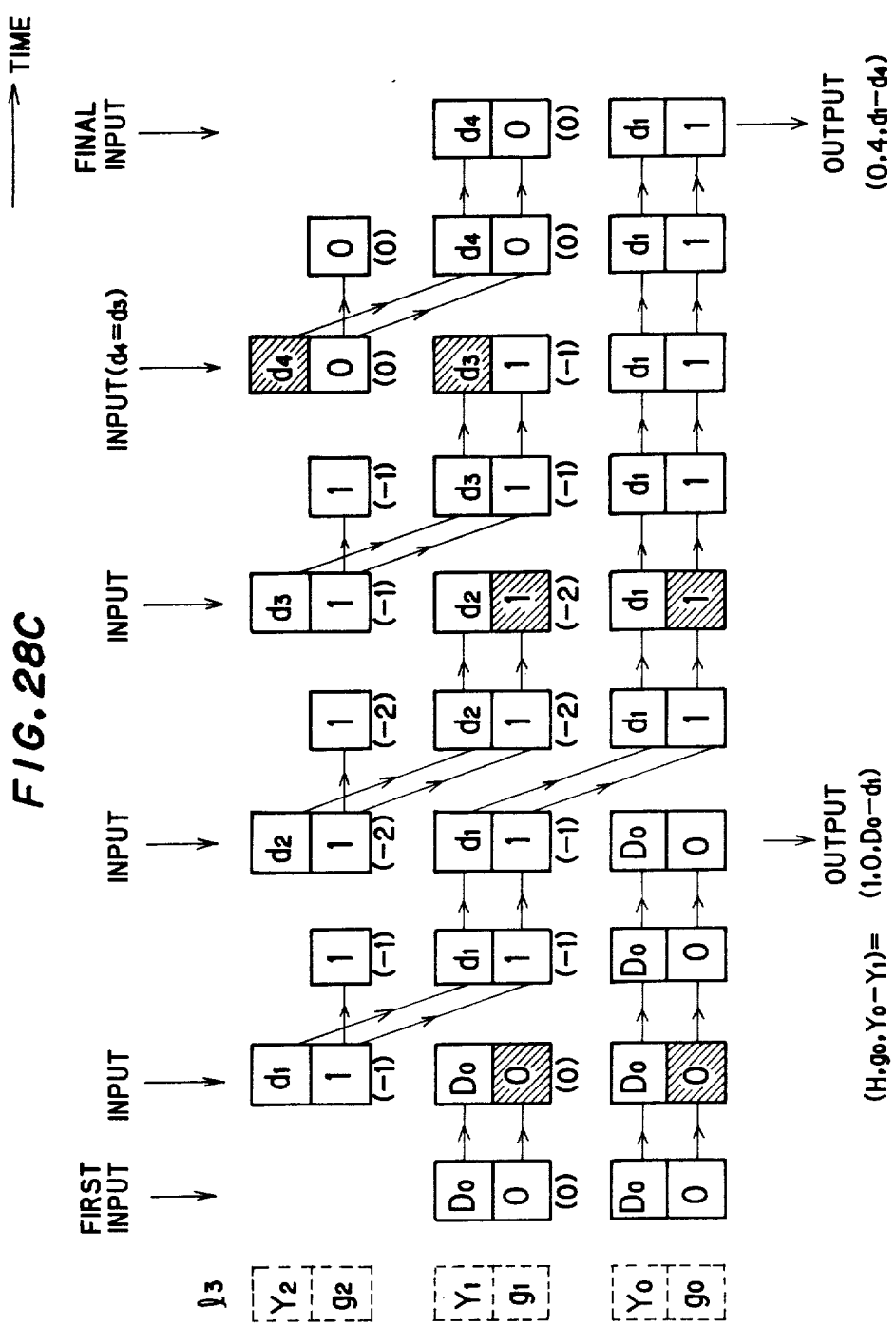

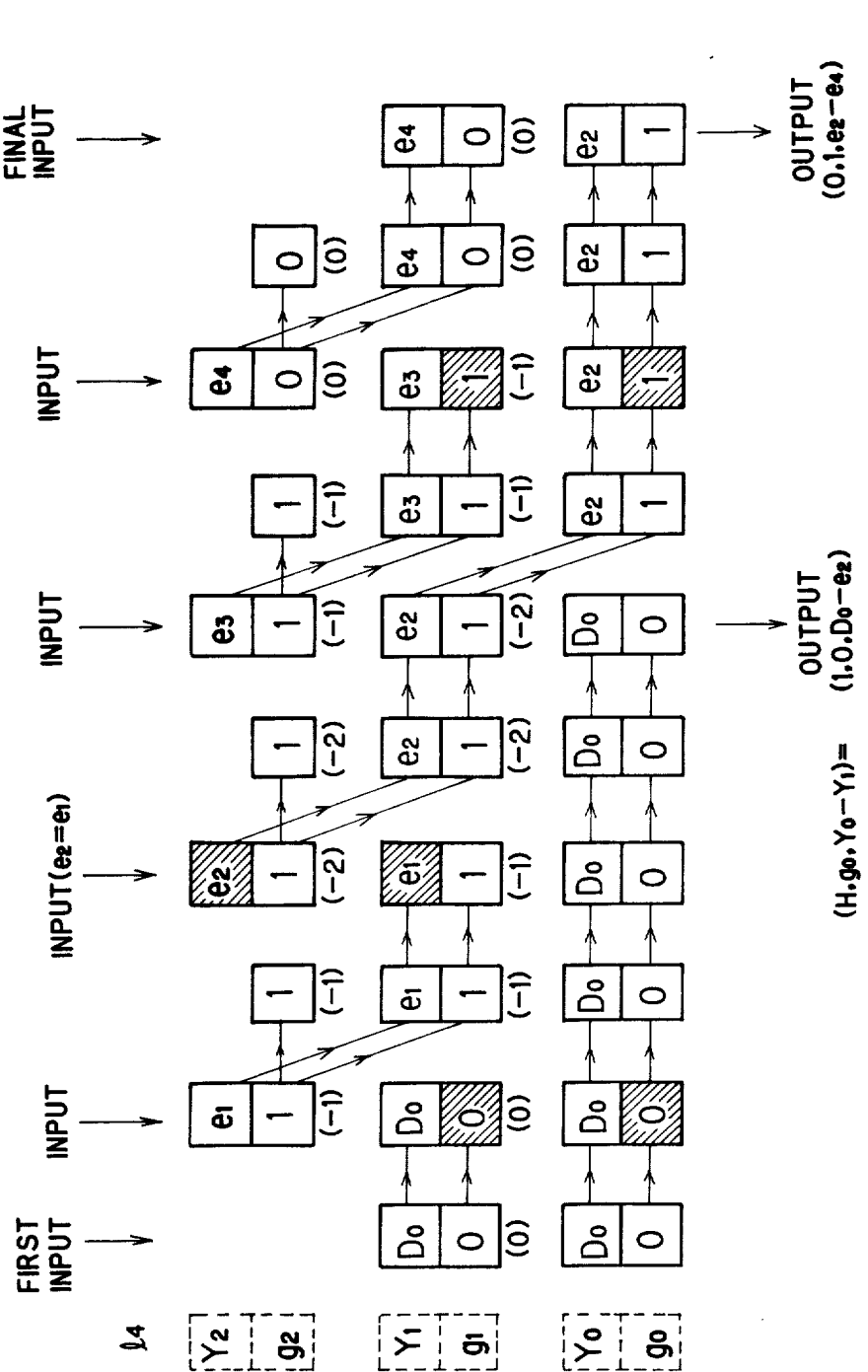

IMAGE DATA PROCESSING METHOD AND APPARATUS THEREFOR

BACKGROUND OF THE INVENTION

1. Field of the Invention

The present invention relates to an image data processing method and an apparatus therefor, for inputting image patterns, such as figures, in the form of vector data to obtain image recording data suitable for recording through sequential scanning.

2. Description of the Prior Art

Well known in the art is an apparatus for recording image patterns inputted from a CAD or the like on a photographic film or printing paper using a sequential scanning/recording system such as a process scanner or a printed circuit pattern recorder. Such image patterns include figues, designs and/or characters. In such an apparatus, data on segments forming respective figure patterns or the like are inputted regardless of sequence along the scanning direction, and hence a function of permuting the inputted patterns along the scanning direction is required.

Such permutation (sorting) of the segments has been generally performed through software processing. However, such a sorting process is executed through comparison processing, and hence the same is not suitable for a computer which is principally designed to perform various calculations at a high speed rather than comparison processing. Therefore, utilization efficiency of the apparatus is reduced when the sorting processing is performed by software manner. Further, software processing does not satisfy the requirement for high speed processing.

In order to perform sorting using hardware, on the other hand, a memory having a recording capacity responsive to the pixel number of the recording plane is prepared. Segment data forming respective unit patterns are written in the memory with recording coordinates thereof being processed as addresses, and then the respective segment data are read in sequence of scanning. In this case, however, a memory of extremely large storage capacity is required.

Consider a case of performing sorting processing on three segments $L_1$ to $L_3$ as shown in FIG. 1A, for example, where circles, squares and triangles denote pixels forming the segments $L_1$ to $L_3$ respectively. In order to sort these segments, a memory having capacity for the entire pixels ($8 \times 8 = 64$ pixels in FIG. 1A) forming the recording plane must be prepared as shown in FIG. 1B. Although the illustrated pixel number is small since FIGS. 1A and 1B are schematic diagrams, an extremely large memory capacity is required in practice. For example, in the recording of the circuit pattern for manufacturing a printed circuit board, the memory capacity amounts to $2^{18} \times 2^{18} = 64$ gigabits for manufacturing a print pattern of 1m $\times$ 1m through pixels of 5 $\mu$m $\times$ 5$\mu$l each.

With such an increase of the memory capacity, further, empty data such as those shown by "—" in FIG. 1B are also accessed when the data are read from the memory in sequence of scanning, whereby memory access time is also increased. Therefore, the total time for data reading is lengthened to slow the processing. When as a result the reading speed cannot keep up with the recording speed, output data must be temporarily stored in a high-speed memory device for read out to a recording apparatus. However, employment of such high-speed memory device leads to an increase in cost.

In order to cope with this, introduced is a concept of "classification memory", which is a memory having capacity for several lines with respect to the subscanning direction, as shown by $S_1$, $S_2$, . . . in FIG. 2. A plurality of such classification memories are prepared to be alternately utilized, thereby to roughly perform sorting in the subscanning direction. Then obtained are data per recording pixel required for recording in the main scanning direction. Such data are written in addresses corresponding to the recording positions in a memory having a capacity identical to the recording pixel number in the main scanning direction. Sorting is also performed at this time. Then data are read in sequence of addresses, to perform image recording. However, such sorting for recording is mainly directed to the case of recording characters or the like on a relatively small recording plane, and hence the same is on the premise that the memory capacity required for one line is small, $2^{16}$ bits, for example.

Therefore, when such a sorting process through the memory for main scanning/recording is applied to image recording directed to a wide region such as the print pattern of a printed board, a capacity amounting to $2^{18}$ bits is required for one line, leading to an increase in memory capacity. When an output device is a multi-channel one having 10 channels, for example, parallel recording for 10 lines is performed in one scanning operation. In order to perform such parallel processing, there are required a memory capacity ten times that of the case of a monochannel device as well as ten memory reading processing units, whereby the apparatus is further increased in size. When such recording is performed through one memory reading unit, data for ten lines may be read in series in one scanning interval. In this case, however, a memory of a high reading speed is required; such a high-speed memory however is expensive.

Thus, an important subject of such an apparatus is to reduce the memory capacity and increase the processing speed in recording on large image plane.

SUMMARY OF THE INVENTION

The present invention is directed to an image data processing method and apparatus for sequentially inputting first vector data expressing segments included in desired image patterns to provide image data for recording of the said image patterns through scanning on the basis of the said first vector data. Scanning herein is achieved by a combination of main scanning and subscanning, and the first vector data include the main scanning coordinate and the subscanning coordinate of at least one terminal point of the segments.

The image data processing method according to the present invention comprises: a first step of sequentially inputting the first vector data to perform radix sorting based on the subscanning coordinate of the terminal point thereby to provide second vector data permuted along the direction of the subscanning; a second step of obtaining corporate values of intersection points of the segments and the main scanning lines on the basis of the second vector data to sequentially output main scanning coordinate values of the intersection points in sequence responsive to subscanning coordinates of the said intersection points; a third step of sorting the main scanning coordinate values of the intersection points along said main scanning direction to output the main scanning coordinate values along the sequence permuted by the sorting; and a fourth step of obtaining image data for recording through scanning on the basis of the main scanning coordinate values of the intersection points provided by the third step to output the image data.

Briefly stated, the radix sorting, which is hereinafter described in detail, is a method of oberving numerical values of respective digits of data in m-ary representation to be sorted in sequence from the lower order digit to repeat classification into m groups in response to the values of the digits.

According to a preferred embodiment of the present invention, the first step includes the following processes in a case wherein the subscanning coordinate of the said terminal point is expressed by m-ary n-digit numerical data: (a) a first process of designating the digits of the numerical data in sequence from the lower order; (b) a second process of alternately or cyclicly selecting one memory block per designated digit from a plurality of memory blocks each having m storage regions capable of storing the numerical data; (c) a third process of sequentially writing the numerical data in any of the storage regions of a selected memory block in response to the value of the designated digit within the numerical data; (d) a fourth process of reading the numerical data from the selected memory block in a sequence responsive to a subsequently designated digit; (e) a fifth process of repeating the third and fourth processes n times synchronously with the digit designation; and (f) a sixth process of performing sequencing on the first vector data in accordance with a sequence of the numerical data by repetition of the third and fourth processes n times, thereby to generate the second vector data and sequentially output the same.

The present invention also provides an apparatus suitable for implementing the aforementioned method. The apparatus according to the present invention comprises: first sorting means for sequentially inputting the first vector data to perform radix sorting based on the subscanning coordinate of the terminal point with respect to the first vector data thereby to provide the second vector data permuted along the subscanning direction; intersection point coordinate operating means for obtaining coordinate values of intersection points of the segments and the main scanning lines on the basis of the second vector data to sequentially output the main scanning coordinate values of the intersection points in sequence responsive to the subscanning coordinates of the intersection points; second sorting means for sorting the main scanning coordinate values of the intersection points to output the main scanning coordinate values in accordance with the sequence permuted by the said sorting along main scanning direction; and image data generating means for obtaining image data for recording through scanning on the basis of the main scanning coordinate values of the intersection points outputted from the second sorting means to output the image data.

Preferably the second sorting means is also formed as means for performing radix sorting.

The present invention is further directed to an image data processing apparatus for sequentially inputting coordinate values of intersection points of segments included in desired image patterns and main scanning lines along the subscanning direction to provide image data for recording through scanning the image patterns on the basis of the coordinate values of the intersection points. This image data processing apparatus comprises: sorting means for performing radix sorting along the main scanning direction with respect to the main scanning coordinate values of the intersection points to output the said main scanning coordinate values in accordance with a sequence permuted by the sorting; and image data generating means for obtaining image data for recording through scanning on the basis of the main scanning coordinate values of the intersection points outputted from the sorting means to output the image data.

Accordingly, an object of the present invention is to provide an image data processing method and an apparatus therefor which can reduce memory capacity required for sorting while performing highly efficient image data processing at a high speed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a detail block diagram of sequential memory blocks 20a and 20b in the FILO rule;

FIG. 20 is a detail block diagram of a unit sorting circuit 5a included in the main scanning direction sorting circuit 5;

FIG. 20A and FIG. 20B are detail block diagrams showing sequential memory blocks 58a and 58b in the *FIFO* rule and the *FILO* rule, respectively;

FIG. 21 is a detail block diagram of a run-length data calculating circuit 6;

FIG. 28A to FIG. 28D are diagrams illustrating examples of the operation of the run-length data calculating circuit 6.

DESCRIPTION OF THE PREFERRED EMBODIMENT

A. Summary of Preferred Embodiment

Figure 3:
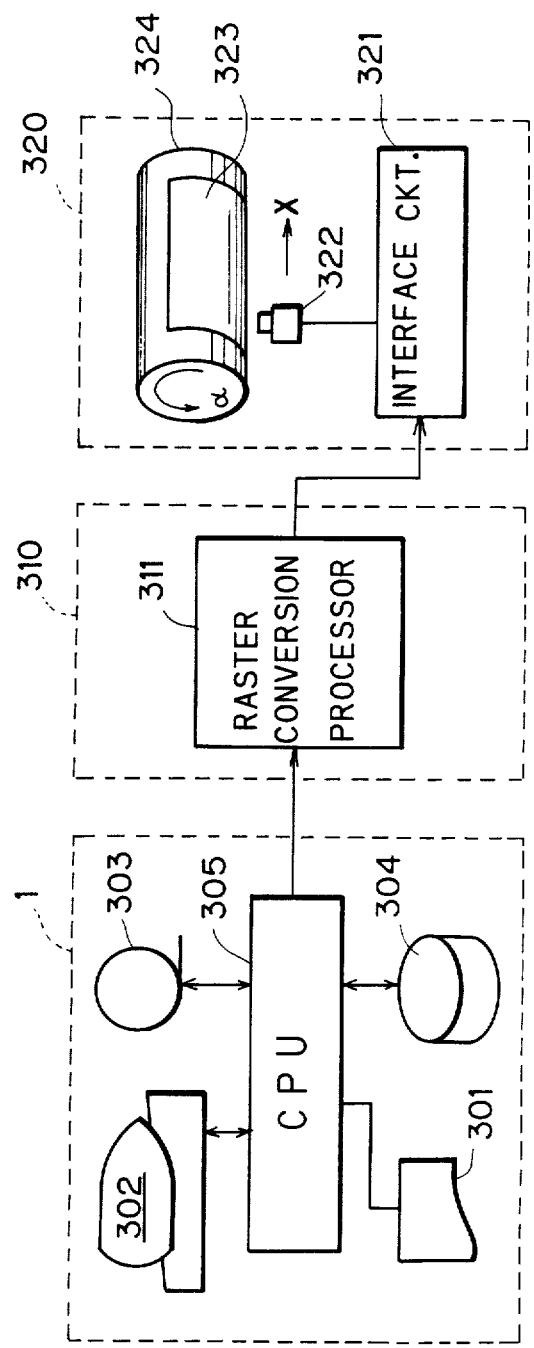
FIG. 3 is a schematic diagram showing a preferred embodiment of the present invention.

FIG. 3 is a block diagram schematically showing an embodiment of the present invention. The apparatus as shown in FIG. 3 comprises a host computer 1 for providing image data such as geometric patterns in the form of sets of segments. The host computer 1 includes a console 301 and an I/O terminal 302 for data input/output. A magnetic tape 303 and a magnetic drum 304 are provided as recording media. The magnetic tape 303 stores image patterns created by a CAD. These devices 301 to 304 are connected to a CPU 305.

The host computer 1 supplies a raster data generator 310 with geometric pattern data created herein in the form of vector data. The raster data generator 310 comprises a raster conversion processor 311, which in turn executes sorting and processing for conversion into raster data. The raster data obtained in the raster conversion processor 311 are supplied to an interface circuit 321 provided in an output portion 320. The interface circuit 321 decodes run-length data thus supplied, to output recording data thereby obtained to an exposure head 322. The exposure head 322 generates multi-channel exposure beams (not shown) on the basis of the recording data. A recording film 323 serving as a photosensitive material is mounted on the surface of a rotary drum 324, to be rotated in the direction α in FIG. 3 synchronously with generation of the exposure beams. This rotation is translated to achieve main scanning. The exposure head 322 is translated in the direction X in order to achieve subscanning. The exposure head 322 outputs the exposure beams with the aforementioned scanning operations, thereby to record a desired image on the film 323.

Figure 4:
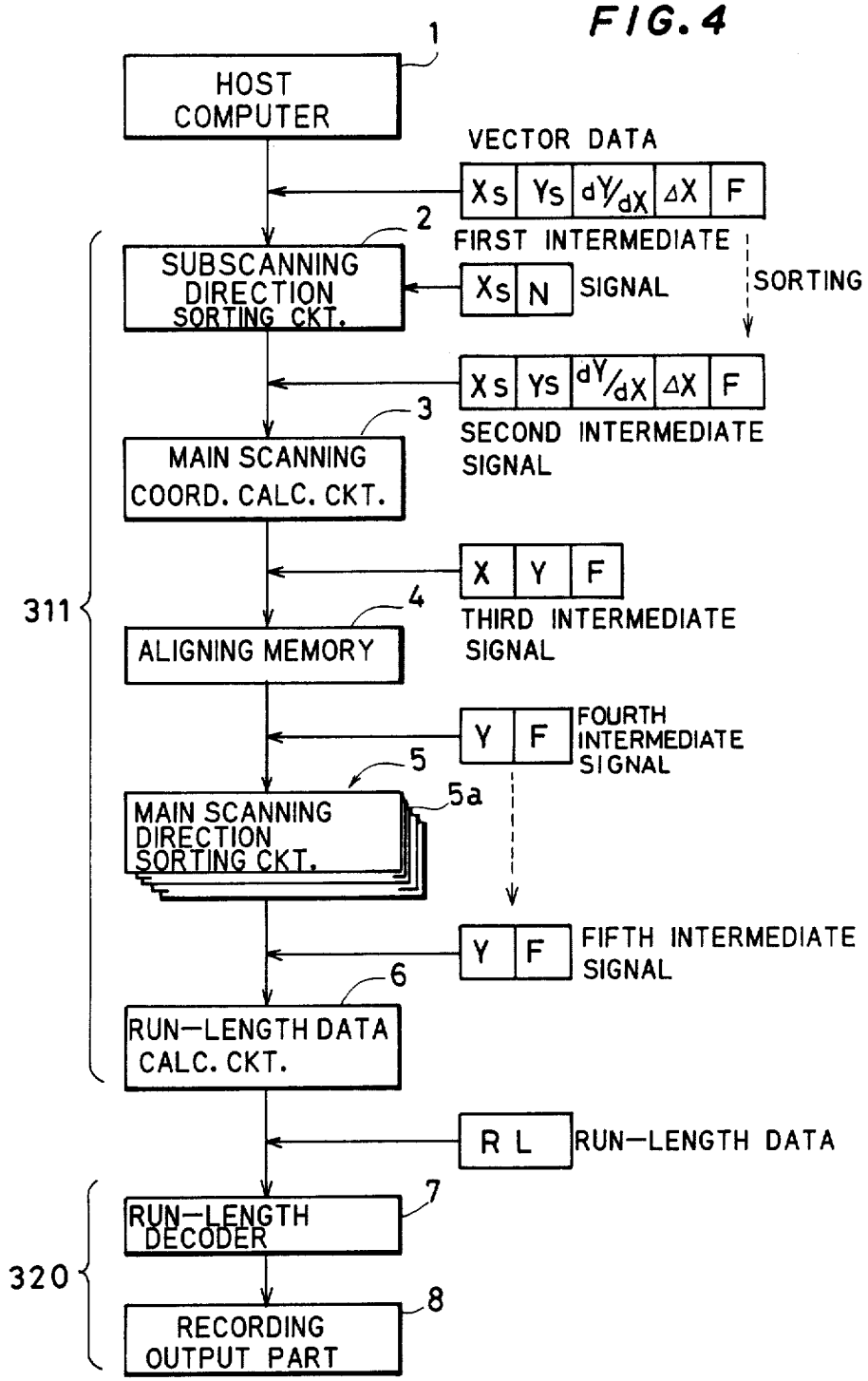
FIG. 4 is a overall block diagram of the embodiment.

FIG. 4 is a block diagram showing the internal structure of the apparatus shown in FIG. 3. The image pattern data, such as figures, stored in the magnetic tape 303 shown in FIG. 3 are decomposed into segments forming respective patterns in the CPU 305 within the host computer 1. The data of the segments are structured as vector data formed by the following respective data (1) to (4):

(1) Recording Start Point Coordinates $X_s$, $Y_s$

Figure 5:
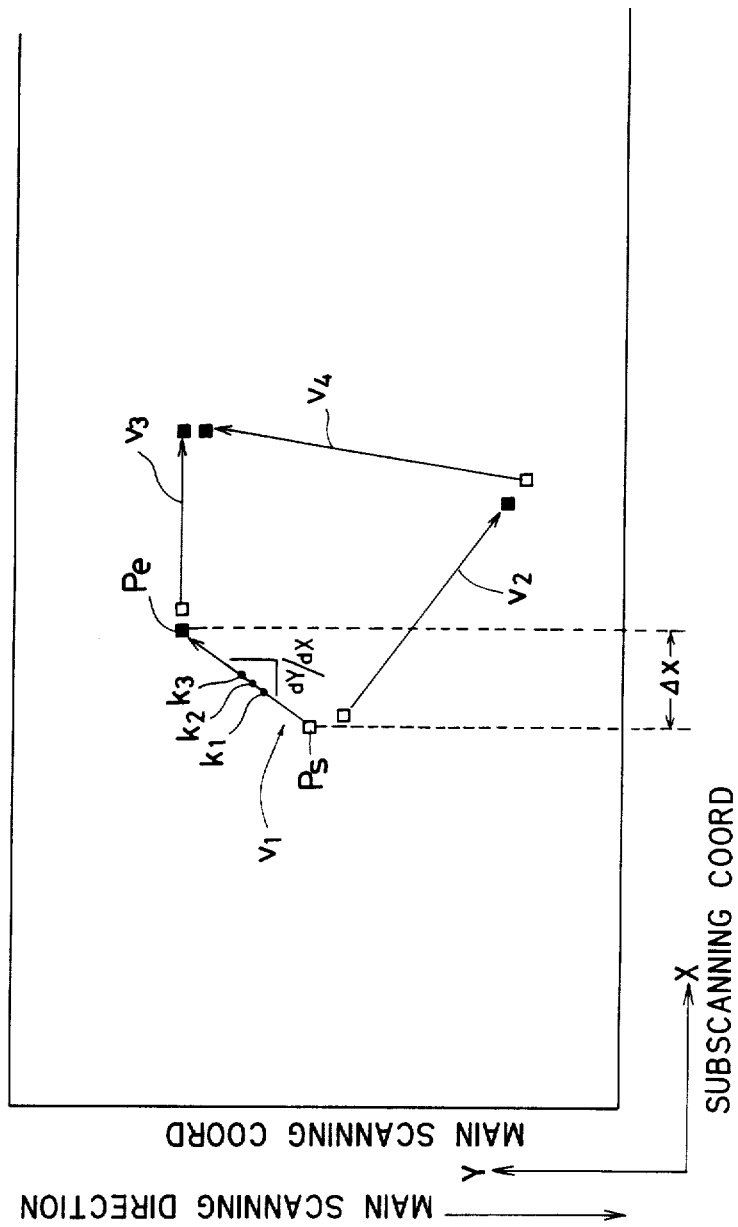
FIG. 5 is an explanatory diagram of vector data.

These are coordinate values of a terminal point $P_s$ prescanned in recording within both terminal points $P_s$ and $P_e$ of a segment, e.g., a segment $v_1$, as shown in FIG. 5. Symbol X denotes the subscanning coordinate and symbol Y denotes the main scanning coordinate.

The other terminal point $P_e$ is called a recording end point. In respective segments $v_1$ to $v_4$ in FIG. 5, white squares denote recording start points and black squares denote recording end points, respectively.

(2) Coefficient of slope dY/dX

This is the data indicating the slope of each segment on the recording coordinate plane, as shown in FIG. 5.

(3) Subscanning Interval ΔX

This is the width in the subscanning direction required from the start to the end of scanning of a segment, and corresponds to, e.g., the mutual distance in the subscanning direction between both the terminal points $P_s$ and $P_e$ of the segment $v_1$, as shown in FIG. 5.

(4) Flag F

This flag is formed by three bits ($F_1$, $F_2$, $F_3$), which indicate the following contents:

(a) Most Significant Bit $F_1$: This is a flag indicating whether the intersection point of a segment and a scanning line is a "black start point", i.e., an exposure start point or a "black end point", i.e., an exposure end point in binary black/white recording. In this embodiment, $F_1$="1" indicates a black start point and $F_1$="0" indicates a black end point.

(b) Second Bit $F_2$: This is a flag indicating positive/negative recording.

(c) The Least Significant Bit $F_3$: This flag is utilized if a plurality of figures are overlapped. Namely, this is a flag for forcibly starting or ending "white" recording when the scanning point reaches a segment regardless of the number of overlapping figures or the like. The meanings of the flag $F_3$ are hereinafter described in detail.

The contents of the vector data outputted from the host computer 1 shown in FIG. 4 have been fully described.

The respective vector data thus outputted from the host computer 1 are supplied to a subscanning direction sorting circuit 2 shown in FIG. 4 in a random order, in sequence of $v_2$, $v_4$, $v_3$ and $v_1$ in FIG. 5, for example. The subscanning direction sorting circuit 2 is provided in correspondence to the feature of the present invention, and is adapted to sort the randomly inputted vector data with respect to the subscanning direction on the basis of the subscanning coordinates $X_s$ of the recording start points of the same. As the result, the vector data are permuted to be outputted in sequence from that having the small subscanning coordinate $X_s$, in sequence of $v_1$, $v_2$, $v_3$ and $v_4$ in FIG. 5, for example. Such a sorting process is performed through a radix sorting method as hereinafter described in detail, with employment of first intermediate signals formed by the following data:

(1) Subscanning Coordinates $X_s$ (2) Sequence Indicating Data N

Within these, the sequence indicating data N are accompanied data for sequentially outputting the respective vector data stored in the subscanning directing sorting circuit 2 along the sequence permuted by sorting, as hereinafter described in detail.

Thus, the subscanning direction sorting circuit 2 outputs second intermediate signals having data contents indentical to the initial vector data in sequence from that having the smallest subscanning coordinate $X_s$.

A main scanning coordinate calculating circuit 3 in the subsequent stage obtains the coordinates (X,Y) of the intersection point of the segment and each main scanning line on the basis of the inputted second intermediate signals. The results are outputted as third intermediate signals formed by the following data:

(1) Coordinate Values (X, Y)
(2) Flag F

Namely, the sorting processing in the subscanning direction has been performed only on the basis of mutual positional relations between the recording start points of the respective segments before this stage, while the respective vector data are decomposed into coordinate data on respective points, e.g., $k_1$, $k_2$, ... in FIG. 5, on the segments through arithmetic in the main scanning coordinate calculating circuit 3.

The third intermediate signals are supplied by several lines to an aligning memory 4 in a subsequent stage, to be written in addresses responsive to the subscanning coordinates X in the aligning memory 4. This aligning memory 4 has a plurality of memories each having capacity for the aformentioned several lines, and the written third intermediate signals in the aligning memory are read out along a subscanning sequence to be converted into fourth intermediate signals. The fourth intermediate signals are formed by the following data:

(1) Main Scanning Coordinate Y
(2) Flag F

The subscanning coordinates X are not included in the fourth intermediate signals because sorting with respect to the subscanning direction has already been completed and the coordinates in the subscanning direction are substantially expressed by the input sequence of the fourth intermediate signals as transmitted.

The fourth intermediate signals are sequentially supplied to a main scanning direction sorting circuit 5, to be sorted by a radix sorting method similarly to the aforementioned sorting in the subscanning direction. Thus, the fourth intermediate signals are permuted in the main scanning direction. The main scanning direction sorting circuit 5 is slightly different in structure from the subscanning direction sorting circuit 2 since the amount of data as processed is different from that of the subscanning direction sorting circuit 2.

The data also sorted with respect to the main scanning direction are supplied to a run-length data calculating circuit 6 as fifth intermediate signals. The fifth intermediate signals have the same data contents as the fourth intermediate signals except that the transfer sequence is different. The run-length data calculating circuit 6 calculates the run-length data RL required for exposure recording, on the basis of the fifth intermediate signals.

The run-length data RL are decoded by a run-length decoder 7. A recording output part 8 records the patterns, such as figures, on a desired recording medium such, as photographic film 323, in accordance with the decoded data.

B. Radix Sorting Method

Description is now made on the principle of a radix sorting method before the respective blocks shown in FIG. 4 are described in detail. This radix sorting method is described in detail in, e.g., "Pipeline Searching and Sorting Modules as Components of a Data Flow Database Computer", Y. Tanaka, Y. Nozaka, and A. Masuyama, IFIP Congress '80, pp. 427 to 432, October 1980. This method will be described within a scope required for understanding the present invention.

Figures 6, 10A, 10B:
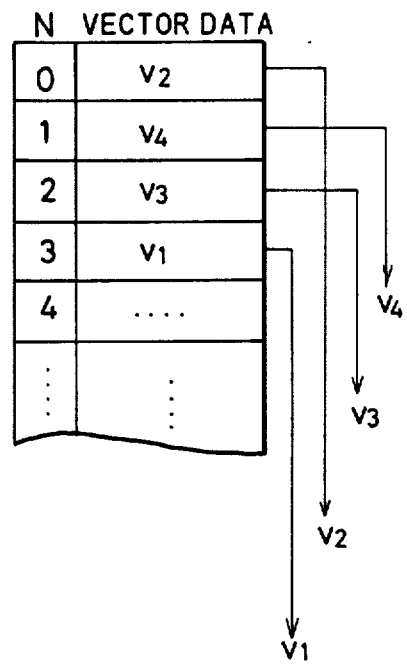
FIG. 6 is an explanatory diagram of a sequence of numbers for illustrating the principle of a radix sorting method.
FIGS. 10A and 10B are explanatory diagrams showing the operation of the subscanning direction sorting circuit 2.

Consider the case of that sixteen four-digit decimal numbers "1203", "8652", ... , and "b 5007" shown in FIG. 6 are inputted in this sequence as indicated by an arrow in FIG. 6, and a permutation of these numbers into ascending order is performed. In the radix sorting method, a plurality of memory blocks each having m storage regions, hereinafter referred to as "buckets", are prepared in sorting of m-ary numbers, where m is an integer. FIGS. 7(a) and 7(b) respectively illustrate a first memory block A and a second memory block B, which are respectively formed by ten buckets $A_0$, $A_1$, ... , $A_9$ and $B_0$, $B_1$, ... , $B_9$.

First, each of the sixteen numbers shown in FIG. 6 is stored in any bucket in the first memory block A in response to which one of the numbers zero to nine the least significant digit corresponds (see FIG. 7(a)). For example, the number "1203" is stored in the bucket $A_3$ since the least significant digit thereof is "3". The sequence of storage may be in the input sequence.

Then these numbers are read from the first memory block A in the sequence of $A_0$ to $A_9$ from the earliest stored number in each bucket. Namely, this reading is performed by an FIFO (first-in first-out) rule with arrows RD indicating the sequence of reading. Each number is stored in any of the buckets $B_0$ to $B_9$ forming the second memory block B in response to which one of the numbers zero to nine the second lowest order digit corresponds.

For example, the number "8200" stored in the bucket $A_0$ shown in FIG. 7(a) is read first. This number is re-stored in the bucket $B_0$ in FIG. 7(b) since the second lowest order digit thereof is "0". Then, the number "3921" and "4321" are read in this sequence from the bucket $A_1$ in FIG. 7(a). These numbers are re-stored in the bucket $B_2$ in FIG. 7(b) along the sequence of reading, since the numbers of the second lower order digits thereof are both "2".

When all of the sixteen numbers stored in the first memory block A are read and re-stored in the second memory block B, the reading operation and the re-storage operation are alternated with respect to the memory blockes A and B, that is, the sixteen numbers are read from the second memory block B also in the sequence of the buckets $B_0$ to $B_9$ and by the FIFO rule in the same bucket. Each number is re-stored in any of the buckets $A_0$ to $A_9$ of the already vacated first memory block A in response to the third lower order digit thereof (see FIG. 7(c)).

Such storage operation is repeated by the number of times, four times in the aforementioned example, responsive to the digit number n of the numbers to be sorted, thereby to obtain the state shown in FIG. 7(d). As is obvious from FIG. 7(d), the numbers subjected to such processing are read also in the sequence of $B_0$ to $B_9$ by the FIFO rule, whereby a sequence of numbers sorted in an ascending order as 1134, 1203, 2203, ... , and 8652 is obtained.

Figure 7:
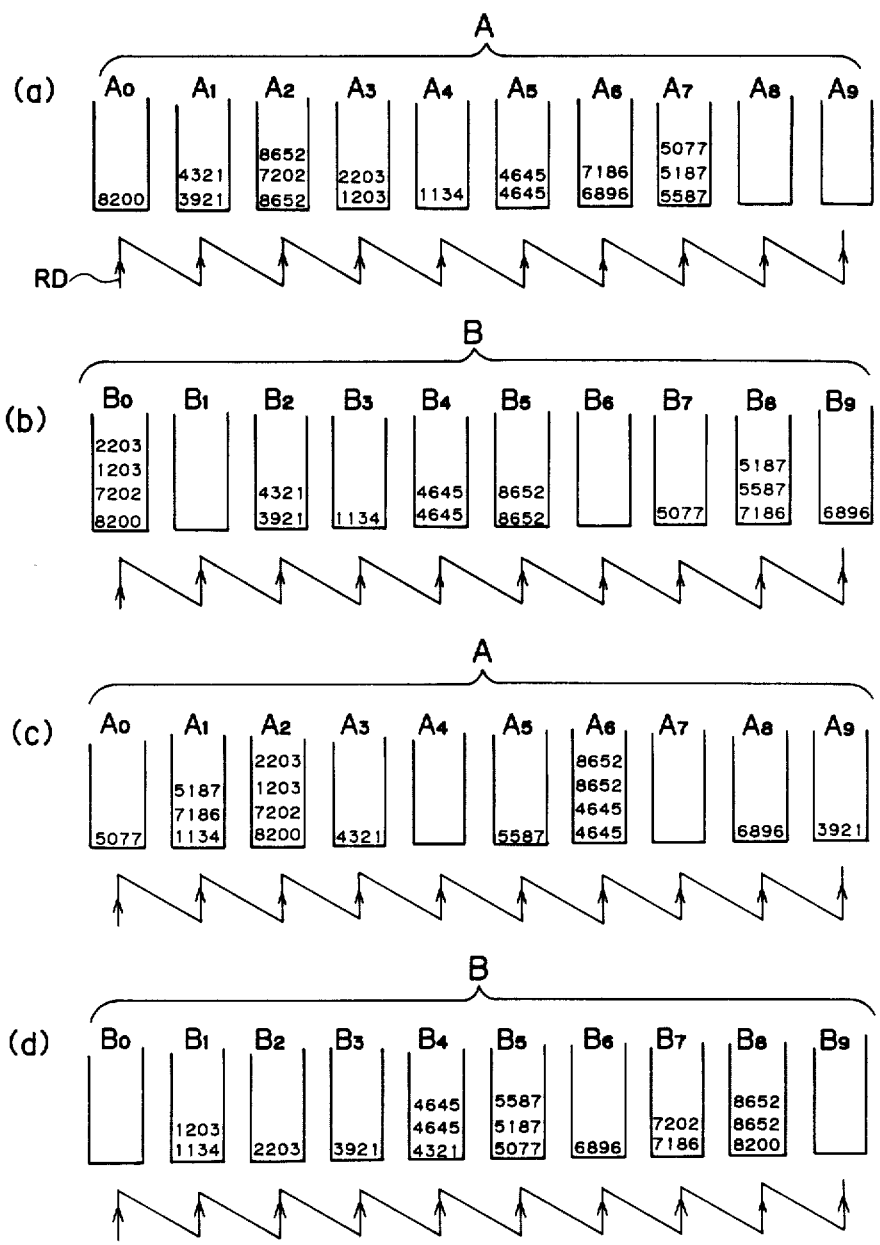
FIG. 7 is an explanatory diagram of a radix sorting method in an FIFO rule.
Figure 8:
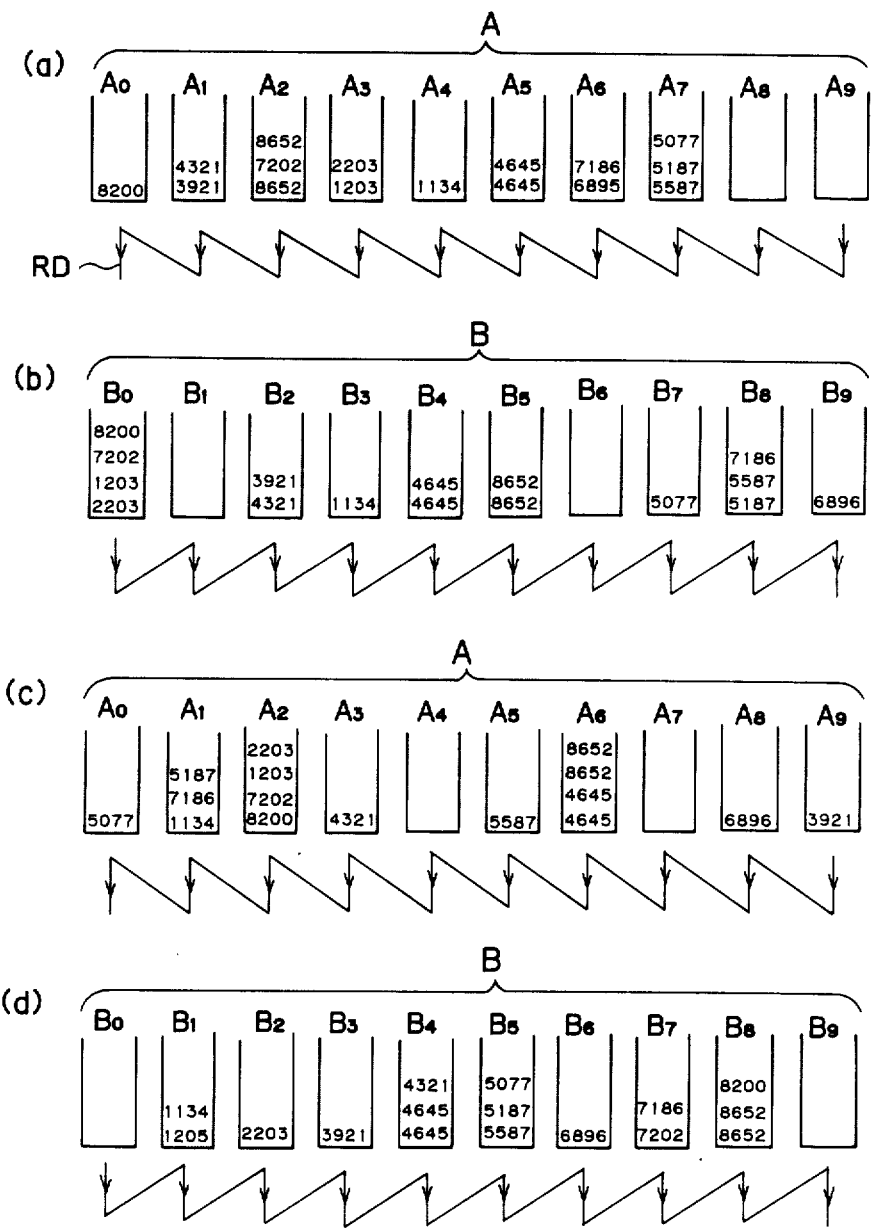
FIG. 8 is an explanatory diagram of a radix sorting method in an FILO rule.

This radix sorting method can also be realized by an FILO (first-in last-out) rule, as illustrated in FIG. 8. In the case of the FILO rule, the first storage state (FIG. 8(a)) is identical to that of the FIFO rule (FIG. 7(a)), while the subsequent reading sequence is different from that of the FIFO rule. In the subsequent re-storage (FIG. 8(a) to FIG. 8(b)), reading is performed in a sequence of $A_9$ to $A_0$ by the FILO rule. In FIG. 8(b) to FIG. 8(c), further, reading is performed in a a sequence of $B_0$ to $B_9$ by the FILO rule in the same bucket.

Namely, these operations are alternately performed by reversing the reading sequence in the units of the buckets from the first memory block A and the reading sequence from the second memory block B. From the finally attained state (FIG. 8(d)), reading is performed in a sequence of $B_0$ to $B_9$ by the FILO rule in the same bucket, thereby to attain the result of sorting similar to that of FIG. 7. In the FIFO rule, the reading direction RD in FIGS. 7 may be made in a sequence of $A_9$ to $A_0$ and $B_9$ to $B_0$, thereby to obtain a sequence of numbers sorted sequentially in a descending order. Similarly in the FILO rule, the direction of reading in FIG. 8(a) and FIG. (c) may be made as $A_0$ to $A_9$ and the reading direction RD in FIG. 8(b) and FIG. (d) may be made in a sequence of $B_9$ to $B_0$, thereby to obtain sequence of numbers sorted sequentially in a descending order.

Mathematical demonstration for proving that the correct sorting is performed through the radix sorting method is described in the IFIP Congress '80, and hence description thereof is omitted here, while the following two matters are to be noted in this method. First, it is sufficient to prepare two memory blocks each having m buckets at the minimum in sorting of m-ary numbers. Second, the storage operation and the reading operation may be performed merely by n times with respect to n-digit numbers. Thus, the memory capacity can be reduced and the processing speed can be increased through application of this method.

C. Detail of Subscanning Direction Sorting Circuit

Figure 9:
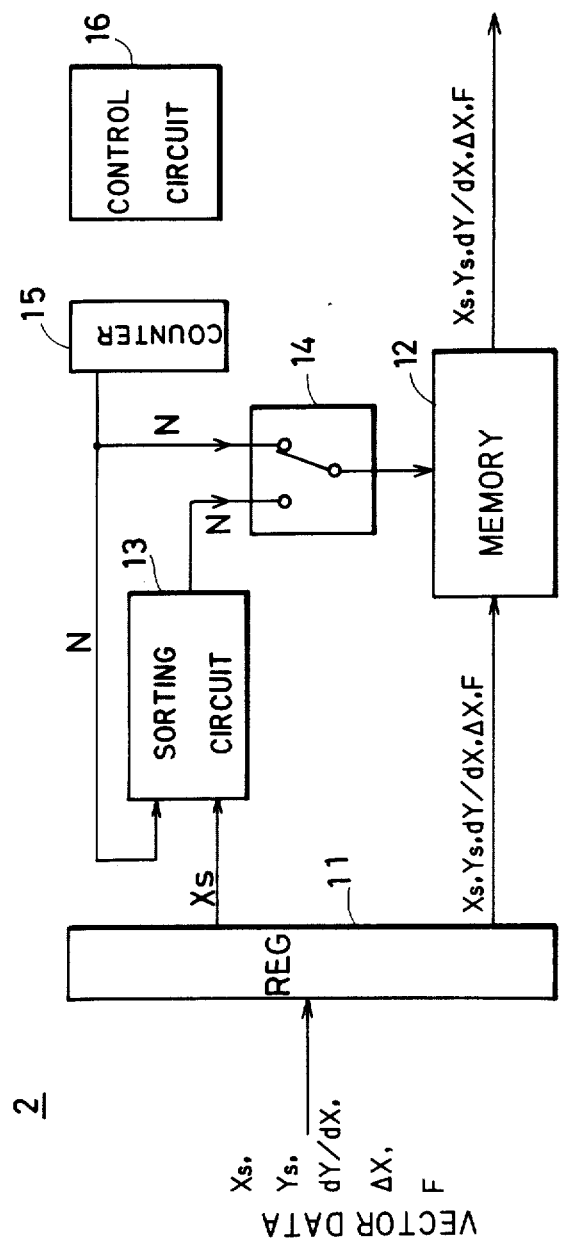
FIG. 9 is a detail block diagram of a subscanning direction sorting circuit 2.

FIG. 9 is a block diagram showing the detailed structure of the subscanning direction sorting circuit 2 for realizing the radix sorting method. Referring to FIG. 9, the vector data sequentially inputted from the host computer 1 shown in FIG. 4 are sequentially stored in a memory (vector data memory) 12 through a register 11. In such a storage operation, a switching circuit 14 is switched to be connected to a counter 15. The sequence indicating data N outputted by sequential count-up of the counter 15 are address inputs to the memory 12. Thus, the respective vector data are stored in the memory 12 in the input sequence. FIG. 10A is a memory map schmatically showing such a storage state, in which the vector data on the segments $v_2$, $v_4$, $v_3$ and $v_1$ as shown in FIG. 5 are supplied along this sequence.

Within the vector data inputted in the register 11, the subscanning coordinates $X_s$ of the recording start points are also supplied to a sorting circuit 13. This sorting circuit 13 receives the subscanning coordinates $X_s$ and the sequence indicating data N, to execute the radix sorting process in the subscanning direction on the basis of the received data.

Figure 11:
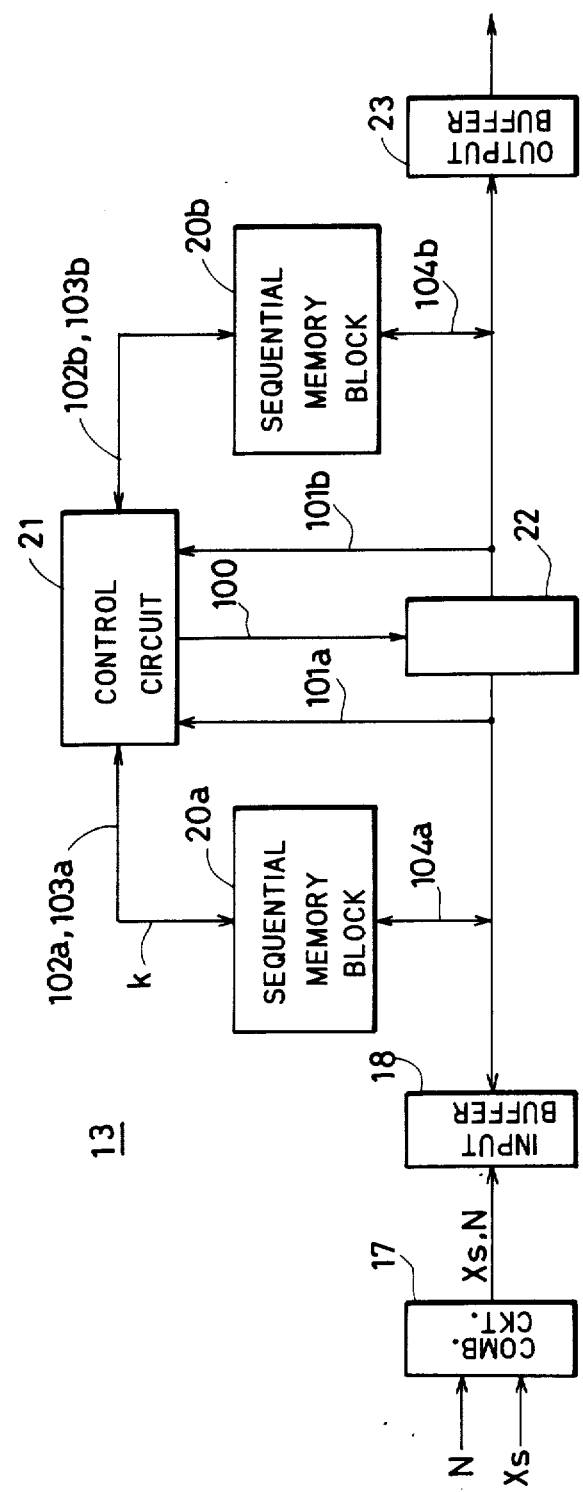
FIG. 11 is a detail block diagram of a sorting circuit 13 included in FIG. 6.

FIG. 11 is a block diagram showing the detail of the sorting circuit 13. This sorting circuit 13 is provided with first and second sequential memory blocks 20a and 20b under control by a control circuit 21, and these sequential memory blocks 20a and 20b are connected with each other through a buffer 22 provided with a bidirectional register (not shown). Respective storage regions of the two sequential memory blocks 20a and 20b correspond to the two memory blocks A and B for radix sorting as hereinabove described with reference to FIG. 7.

In the sorting circuit 13 shown in FIG. 11, a combinational circuit 17 combines the subscanning coordinates $X_s$ with the sequence indicating data N to generate first intermediate signals ($X_s$, N) including the coordinate numerical values $X_s$ and the accompanied data N. The first intermediate signals are first stored in the first sequential memory block 20a.

Figure 12:
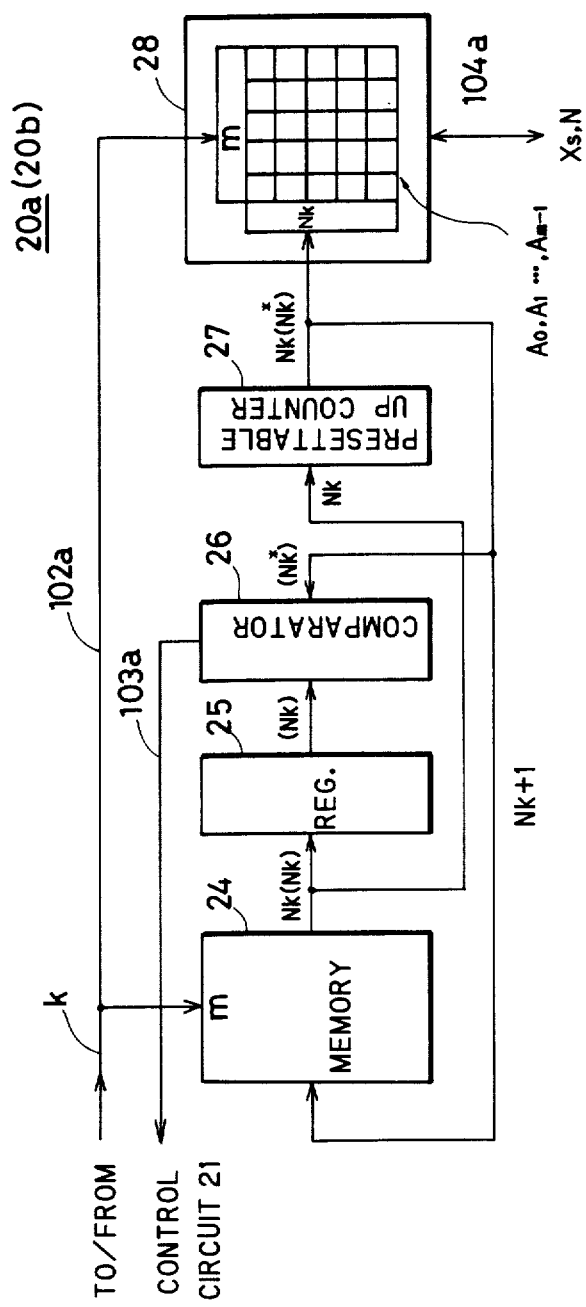
FIG. 12 is a detail block diagram of sequential memory blocks 20a and 20b in the FIFO rule.

FIG. 12 illustrates internal structure common to the first and second sequential memory blocks 20a and 20b formed by applying the FIFO rule. The following description is made on the assumption that the internal structure shown in FIG. 12 is that of the first sequential memory block 20a. Within signals ($N_k$ etc.) shown in FIG. 12, those without parentheses are employed for illustrating the operation of writing the first intermediate signals in the sequential memory block 20a, while those with parentheses are employed for illustrating the operation for reading the first intermediate signals from the same.

Figure 13:
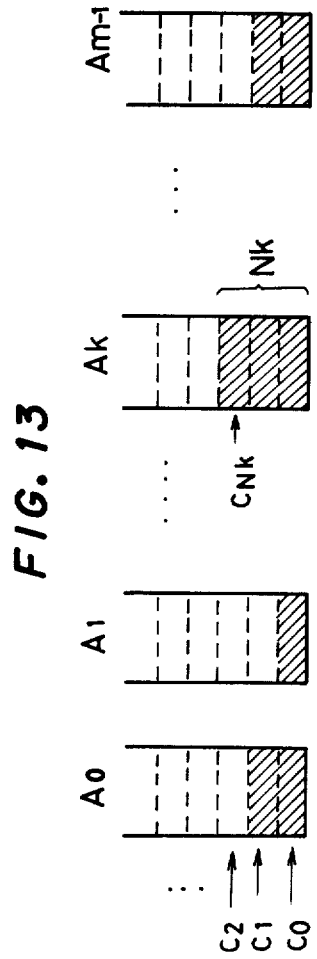
FIG. 13 is an explanatory diagram of buckets.

As shown in FIG. 12, the first sequential memory block 20a is provided with a memory block 28, which is divided into a plurality of storage regions, i.e., buckets as hereinabove described with reference to FIG. 7. When the subscanning coordinates $X_s$ are expressed in m-ary numbers, the number of these buckets is also m. FIG. 13 schmatically shows the m buckets $A_0$, $A_1$, ... , and $A_{m-1}$, and each bucket is formed by memory cells $C_0$, $C_1$, $C_2$, ... In FIG. 13, slash portions denote memory cells storing data.

In storing a first intermediate signal in the memory block 28 shown in FIG. 12, a bucket designating signal 102a provided by the control circuit 21 shown in FIG. 11 first designates the bucket for storing the same. The control circuit 21 generates the bucket designating signal 102a by fetching the first intermediate signal through a line 101a shown in FIG. 11 and reading the numerical value of the least significant digit of the subscanning coordinate $X_s$ therein. Namely, when the least significant digit of the subscanning coordinate Xs is k, the bucket designating signal 102a indicates that the first intermediate signal is to be stored in the bucket $A_k$.

On the other hand, the bucket designating signal 102a is also supplied to a memory 24 shown in FIG. 12 for registering the numbers of the first intermediate signals stored in the respective buckets. This memory 24 has memory cells corresponding to the respective buckets. The number $N_k$ of the first intermediate signals already stored in a bucket (e.g., $A_k$) is read from a memory cell designated by the bucket designating signal 102a, to be loaded in a presettable up counter 27. The value $N_k$ is supplied to a memory 28 as an address signal. As a result, the first intermediate signal is stored in an ($N_k+1$)-th cell $C_{Nk}$ within the memory cells $C_0$, $C_1$, $C_2$, ... shown in FIG. 13 included in the bucket $A_k$ of the memory 28 through a first intermediate signal input-/output line 104a. Thereafter the presettable up counter 27 counts up by ($+1$) so that the output ($N_k+1$) thereof is stored in the memory cell of the memory 24 where $N_k$ was stored.

Such operation is repeated so that all of the inputted first intermediate signals are stored in any of the respective buckets in the memory 28 in sequence of the memory cells $C_0$, $C_1$, ... On the other hand, the respective memory cells of the memory 24 store the numbers of the first intermediate signals stored in the corresponding buckets. Thus, the state shown in FIG. 7(a) is realized.

In a subsequent stage, operation corresponding to data transfer from FIG. 7(a) to FIG. 7(b) is performed. This operation is performed by reading the first intermediate signals from the first sequential memory block 20a of FIG. 11 to transfer the same to the second sequential memory block 20b through the buffer 22 with a bidirectional register.

Description is now made of the operation for reading the first intermediate signals from the first sequential memory block 20a again with reference to FIG. 12. The reading operation is performed in sequence of buckets $A_0$ to $A_{m-1}$ by applying the FIFO rule. Consider the case where reading from the buckets $A_0$ to $A_{k-1}$ has already been completed and the process is advanced to the stage of operation for reading from the bucket $A_k$. At this time, the bucket $A_k$ is first designated by the bucket designating signal 102a. The number ($N_k$) of the first intermediate signals stored in the bucket $A_k$ is read from the memory 24 on the basis of the bucket designating signal 102a, to be supplied to a comparator 26 through a register 25.

On the other hand, the presettable up counter 27 has been cleared before the operation for reading from the bucket is started, and supplies address signals ($N_k{}^*$) which are incremented sequentially by (+1) from zero. Therefore, the first intermediate signals are sequentially read from the bucket $A_k$ in sequence of the memory cells $C_0, C_1, \ldots$ to be outputted through the first intermediate signal input/output line 104a. The writing of the first intermediate signals in the bucket $A_k$ has been performed in the sequence of $C_0, C_1, \ldots$, and hence FIFO operation is realized.

In such a reading operation, the output from the presettable up counter 27 is also supplied to the comparator 26. The comparator 26 generates a coincidence signal 103a when the signal ($N_k$) from the register 25 coincides with the signal ($N_k{}^*$) from the presettable up counter 27, i.e., when ($N_k{}^*$) is incremented from zero to ($N_k$), to output the same to the control circuit 21 of FIG. 11. Thus, the reading operation from the first sequential memory block 20a is temporarily completed.

The first intermediate signals read through the aforementioned operation are buffered by the buffer 22 with a bidirectional register of FIG. 11, to be supplied to the second sequential memory block 20b through another first intermediate signal input/output line 104b. As hereinabove described, the structure of the second sequential memory block 20b is similar to that shown in FIG. 12, whereby read/write operation similar to that of the first sequential memory block 20a is performed. However, a bucket designating signal 102b in the reading operation at this time is a signal having a value determined on the basis of the number of the second lowest order digit of the subscanning coordinate $X_s$ included in the first intermediate signal inputted by the control circuit 21 through the line 101b shown in FIG. 12.

Thus, between the first and second sequential memory blocks 20a and 20b, the reading/storage of the first intermediate signals are alternately performed in accordance with the radix sorting method as hereinabove described with reference to FIG. 7. When the digit number of the subscanning coordinates $X_s$ is n, the number of times of reading/storage, or reading/writing, is also n. Upon completion of the n-th reading/storage operation, the first intermediate signals come in such a state wherein the subscanning coordinates are sorted in sequence from the smallest one, i.e., in a ascending order. It is to be noted that three or more sequential memory blocks can be prepared to be cyclicly selected and used.

The signals read from the first or second sequential memory block 20a or 20b by the n-th reading operation are supplied to an output buffer 23 shown in FIG. 11 in sorted sequence. The output buffer 23 extracts the sequence designating data N from the first intermediate signals, to transmit the same to the switching circuit 14 shown in FIG. 9. The switching circuit 14 has been switched to the sorting circuit 13 side before this point of time, whereby the sequence designating data N become address inputs in the memory 12 in the sequence of transmission. Then the vector data stored in the memory 12 are outputted along the sequence designated by the address signals.

The aforementioned operation is now described with reference to a case wherein the vector data are stored in the memory 12 as shown in FIG. 10A. Assuming that the subscanning coordinates of the recording start points of the segments $v_1, v_2, \ldots$ of FIG. 5 are represented by $X_{s1}, X_{s2}, X_{s3}$ and $X_{s4}$ respectively, the following relation (1) holds as obvious from FIG. 5:

(1) $X_{s1} < X_{s2} < X_{s3} < X_{s4}$

Consider such case where the vector data are initially inputted in a sequence of $v_2, v_4, v_3$ and $v_1$. Then the first intermediate signals are generated in the following sequence (2). Thereafter the aforementioned sorting processing is executed, whereby the first intermediate signals are permuted in the following sequence (3).

(2) $(N, Xs) = (0, X_{s2}), (1, X_{s4}), (2, X_{s3}), (3, X_{s1}), \ldots$ (3) $(N, Xs) = (3, X_{s1}), (0, X_{s2}), (2, X_{s3}), (1, X_{s4}), \ldots$ Therefore, the sorting circuit 13 shown in FIG. 9 sequentially supplies the memory 12 with the sequence designating data N in the following sequence (4):

(4) $N = 3, 0, 2, 1, \ldots$

As shown in FIG. 10A, the vector data stored in memory 12 are addressed by N. Therefore, when the sequence designating data N are supplied in sequence (4), the vector data are outputted from the memory 12 in the following sequence (5) as shown in FIG. 10B:

(5) $v_1, v_2, v_3, v_4, \ldots$

These are vector data sorted and permuted in the subscanning direction, which are supplied to the main scanning coordinate calculating circuit 3 shown in FIG. 4 as the second intermediate signals.

Figure 14:
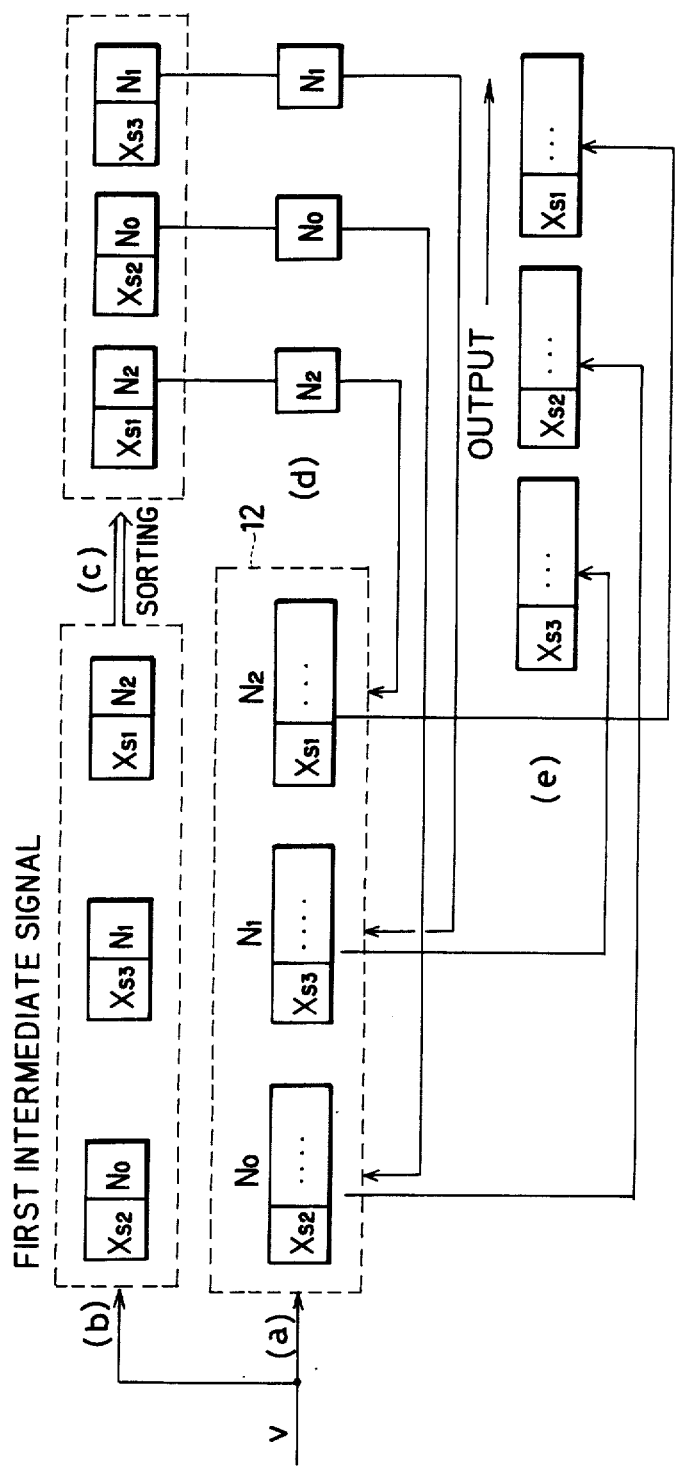
FIG. 14 is an explanatory diagram showing the operation of the subscanning direction sorting circuit 2.

Namely, the subscanning direction sorting circuit 2 performs the following operations (a) to (e) as typically shown in FIG. 14. It is to be noted that only three vector data $v_1$ to $v_3$ are shown for convenience.

(a) The sequentially inputted vector data v ($v_2, v_3, v_1$) are stored in the memory 12 with addresses of the sequence designating data N ($N_0, N_1, N_2$);

(b) the sequence designating data N are combined with the subscanning coordinates $X_s$ ($X_{s2}, X_{s3}, X_{s1}$) to create the first intermediate signals;

(c) the first intermediate signals are stored in sequence from the smallest subscanning coordinate;

(d) the sorting result is obtained in the form of the order of timing of the sequence of designating data N; and (e) the vector data v are read from the memory 12 on the basis of the order of timing of the sequence designating data N.

Therefore, when the vector data v are regarded as "loading" and the memories are regarded as "storehouses", the first intermediate signals have meaning as "cutforms" employed for determining the sequence for discharging the "loading". The sequence designating data, or accompanied data, N correspond to "collating numbers" for relating the "loading" with the "cutforms". The sorting is performed through such a method because the vector data themselves have a large amount of information and hence the efficiency is deteriorated when the sorting is performed by repeatedly transferring the vector data themselves between the memories. The control circuit 16 shown in FIG. 9 is adapted to perform timing control etc. of the respective operations.

As hereinabove described, the radix sorting method can be also realized through FILO processing. FIG. 15 shows an exemplary circuit employed in the FILO processing as the sequential memory block 20a or 20b shown in FIG. 11. The circuit shown in FIG. 15 is provided with a memory 33 for storing the first intermediate signals and a memory 31 for storing the numbers of the first intermediate signals stored in the respective buckets of the memory 33, similarly to the circuit shown in FIG. 12.

The operation for writing the first intermediate signals in this circuit is substantially similar to that of the FIFO case. Namely, one of the buckets included in the memory 33 is first selected by a bucket designating signal 102a supplied in response to the numerical value of each digit of the subscanning coordinates. The number $N_k$ of the first intermediate signals already stored in the bucket is read from the other memory 31, to be supplied to a presettable up/down counter 32. This presettable up/down counter 32 serves as an up counter in data writing. Therefore, after $N_k$ is supplied from the counter 32 to the memory 33 so that the first intermediate signal is stored in a memory cell $C_{Nk}$ in the bucket $A_k$, the counter 32 counts up by $(+1)$ to return $(N_k+1)$ to the memory 31.

In operation for reading the first intermediate signals, on the other hand, the bucket designating signal 102a is adapted to designate the buckets in the sequence of $A_{m-1}, A_{m-2}, \ldots, A_0$. This is the operation in a case wherein the circuit of FIG. 15 is employed as the first sequential memory block 20a shown in FIG. 11. When the circuit of FIG. 15 is employed as the second sequential memory block 20b, the buckets are designated in the sequence of $A_0, A_1, \ldots, A_{m-1}$, as hereinabove described with reference to FIG. 8.

The presettable up/down counter 32 serves as a down counter in data reading. Therefore, in order to read the first intermediate signals from the bucket $A_k$ for example, the bucket designating signal 102a designates the bucket $A_k$ in the memory 33. Then the storage number $(N_k)$ of the first intermediate signals is read from the memory cell in the memory 31 corresponding to the bucket $A_k$ to be loaded in the counter 32. The number $(N_k)$ is then supplied to the memory 33. Thus, the memory cell finally storing the first intermediate signals within the memory cells in the bucket $A_k$ is accessed. As a result, the finally stored first intermediate signals are outputted from the first intermediate signal input/output line 104a.

Thereafter the counter 32 counts down sequentially by one, whereby the first intermediate signals are read in sequence of the memory cells $C_{Nk}, \ldots, C_0$. When reading from the memory cell $C_0$ is completed and the count value of the counter 32 is zeroed, the counter 32 outputs a reading completion signal 105 corresponding to the coincidence signal 103a shown in FIG. 12 to the control circuit 21 of FIG. 11, thereby to complete the reading operation.

The sorting based on the FILO rule is merely different from the FIFO case in the structure of the sequential memory blocks 20a and 20b and the control signal supplied by the control circuit 21. The structure and operation of the remaining part can be understood from the above description of the FIFO case with reference to FIG. 8, and hence description thereof is omitted.

D. Details of Main Scanning Coordinate Calculating Circuit

Figure 16:
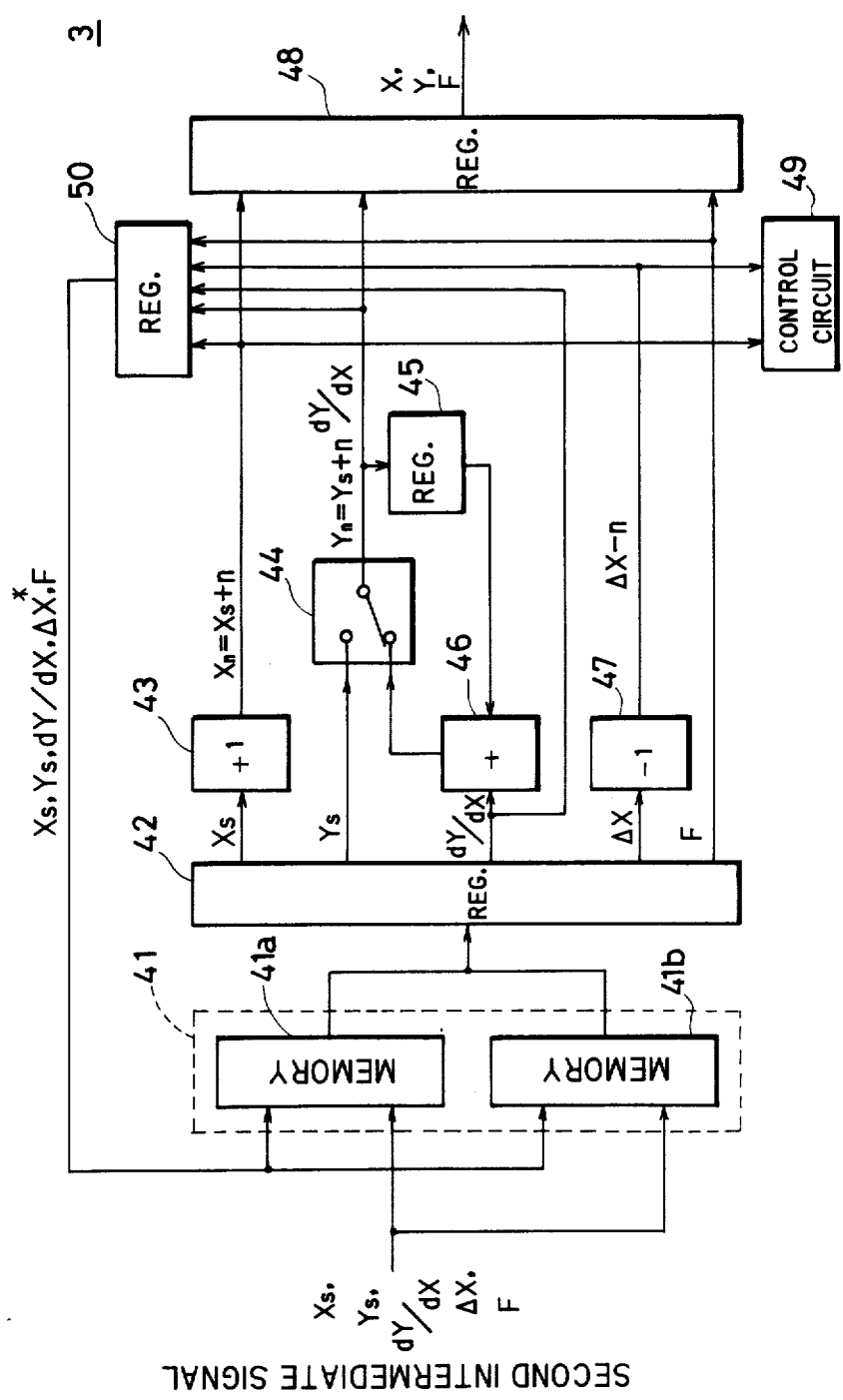
FIG. 16 is a detail block diagram of a main scanning coordinate calculating circuit 3.

FIG. 16 is a block diagram showing the detail of the main scanning coordinate calculating circuit 3. Similarly to the initial vector data, the second intermediate signals inputted in the main scanning coordinate calculating circuit 3 are formed by the following data (1) to (4):

(1) Recording Start Point Coordinates (Xs, Ys)
(2) Coefficient of Inclination(slope) dY/dX
(3) Subscanning Interval ΔX
(4) Flag F Unlike to the initial vector data, the second intermediate signals are inputted in sequence from the smallest subscanning coordinates $X_s$ of the recording start point included therein, i.e., in ascending order.

In the main scanning coordinate calculating circuit 3, a memory 41 formed by two unit memories 41a and 41b first fetches the second intermediate signals. The unit memories 41a and 41b respectively have capacity for several scanning lines, to be alternately employed for writing and reading. The following description is made of the operation at a point in time when the first unit memory 41a is for writing and the second unit memory 41b is for reading.

Figure 17:
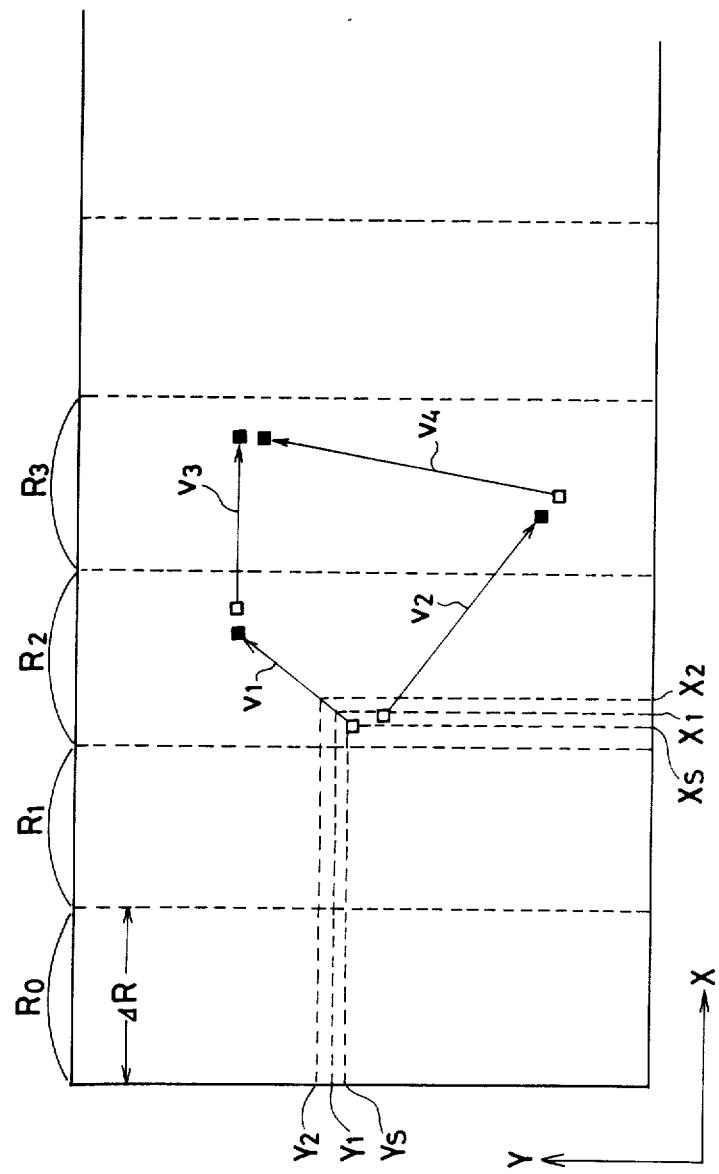
FIG. 17 and FIG. 18 are diagrams for illustrating the operation of the main scanning coordinate calculating circuit 3.

When a second intermediate signal is being written in the first unit memory 41a, another second intermediate signal already written in the second unit memory 41b is read from the second unit memory 41b to be output to a register 42. In the case of FIG. 17, when second intermediate signals on segments v3 and v4 are being written in the first unit memory 41a, for example, other second intermediate signals in segments v1 and v2 already written in the second unit memory 41b are read to be outputted to the register 42.

Within the second intermediate signals latched in the register 42, the subscanning coordinates $X_s$ of the recording start points are preset in a presettable up counter 43. The presettable up counter 43 is incremented by $(+1)$, to sequentially generate X coordinate data $X_s, X_1, X_2, \ldots$ of intersection points of the segments v and the scanning lines shown in FIG. 17 to supply the same to a register 48, where $$X_1 = X_s + 1,$$

$$X_2 = X_1 + 1 = X_s + 2, \ldots$$

$$X_2 = X_{n-1} + 1 = X_s + n \ldots$$

On the other hand, the main scanning coordinates $Y_s$ of the recording points are supplied from the register 42 to a switching circuit 44. The switching circuit 44 is connected to the register 42 side at this point in time, whereby the main scanning coordinates $Y_s$ directly pass the switching circuit 44 to be supplied to a register 48 as well as latched in a register 45. Thereafter the switching circuit 44 is switched to an adder 46 side. Therefore, the main scanning coordinates $Y_s$ from the register 45 are added up by the adder 46 with the coefficients dY/dX of inclination so that $$Y_1 = Y_s + dY/dX$$

to be outputted to the register 48 through the switching circuit 44.

The main scanning coordinates $Y_1$ are further returned to the adder 46 side through the register 45. Therefore, the aforementioned operation is so repeated that a train $Y_s, Y_1, Y_2, \ldots$ of the main scanning coordinates of the intersection points of the segments v and the scanning lines are sequentially generated as shown in FIG. 17, to be transmitted to the register 48, where $$Y_1 = Y_s + dY/dX$$

$$Y_2 = Y_1 + dY/dX = Y_s + 2dY/dX \ldots$$

$$Y_n = Y_{n-1} + dY/dX = Y_s + ndY/dX \ldots$$

The subscanning interval $\Delta X$ supplied from the register 42 is loaded in a presettable down counter 47, to be decremented by 1. At a point of time when n coordinates of intersection points are calculated, the counter 47 outputs ($\Delta X - n$). The output signal ($\Delta X - n$) serves as an index indicating the number of the coordinates of the intersection points to be calculated with respect to the segment.

The coordinates (X, Y) of the intersection points of the segment and the scanning lines, i.e., ($X_s, Y_s$), ($X_1, Y_1$), ($X_2, Y_2$), ... thus generated become third intermediate signals including the flags F directly supplied from the register 42 to the register 48, and the third intermediate signals are outputted from the register 48. When ($\Delta X - n$) outputted from the presettable down counter 47 is zeroed, a control circuit 49 detects this state to complete processing on the segment.

The main scanning coordinate calculating circuit 3 in this embodiment is adapted to calculate intersection coordinates by several lines, e.g., eight lines, to output the same. With reference to FIG. 17, the recording plane is divided per prescribed line number $\Delta R$ in the subscanning direction to provide a plurality of partial regions each having a width $\Delta R$ in the subscanning direction. After the coordinates of intersection points belonging to a first region $R_0$ are completely calculated, the coordinates of intersection points belonging to a second region $R_1$ are calculated. These partial regions $R_0, R_1, R_2, \ldots$ define ranges of the second intermediate signals to be alternately stored in the unit memories 41a and 41b shown in FIG. 16.

Therefore, in order to calculate intersection point coordinates of a segment extending over two or more regions, such as $R_2$ and $R_3$ for the segment $v_2$ shown in FIG. 17, calculation of the intersection point coordinates with respect to the segment $v_2$ is temporarily interrupted in the stage of completely calculating the coordinates of the intersection points belonging to the region $R_2$. Then intersection point coordinates are similarly calculated with respect to another segment $v_3$ having start point coordinates in the region $R_2$.

Then, after the write/read operations of the unit memories 41a and 41b take turns to shift to calculation of the intersection point coordinates with respect to the region $R_3$, the coordinates of remaining intersection points of the segments $v_2$ and $v_3$ are calculated. Namely, intersection point coordinates of regions scanned in advance are previously calculated, not to obstruct the progress of recording/scanning.

Therefore, when the subscanning coordinate X becomes a coordinate value belonging to a subsequent region, e.g., $R_3$, before ($\Delta X - n$) is zeroed in the circuit shown in FIG. 16, the coordinates (X, Y) and the number $\Delta X^*$ (= $\Delta X - n$) of subscanning lines remaining at that time are assumed to be new start point coordinates ($X_s, Y_s$) and a new subscanning interval $\Delta X$ respectively through determination by the control circuit 49. These are combined with the coefficient dY/dX of inclination and the flag F, thereby to create new second intermediate signals. These second intermediate signals are written in the unit memory 41a under writing through a register 50 shown in FIG. 16.

When generation of the third intermediate signals with respect to a region, e.g., $R_2$ in FIG. 17, and generation/storage of the aforementioned new second intermediate signals are completed, read/write operations of the unit memories 41a and 41b take turns. Signals read from the memory 41a to be newly read include the new second intermediate signals generated in the main scanning coordinate calculating circuit 3 in the aforementioned manner in addition to the second intermediate signals directly supplied from the subscanning direction sorting circuit 2 and stored therein.

Figure 18:
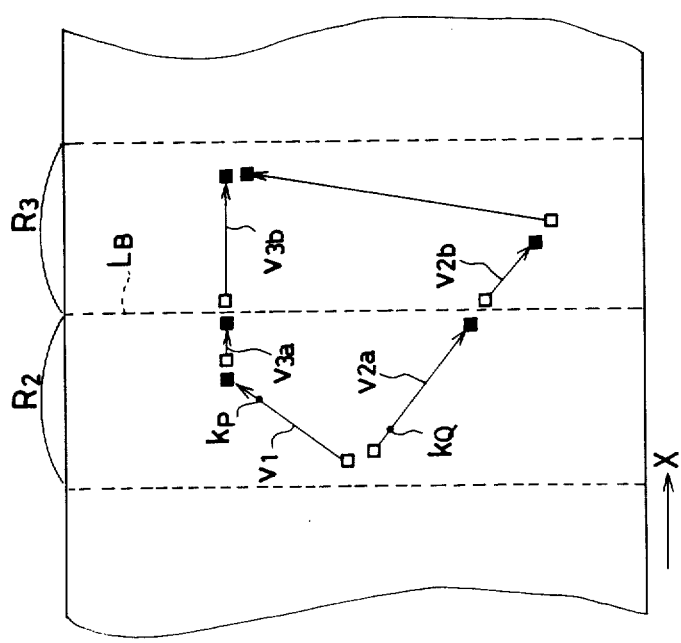

Namely, with respect to segments such as $v_2$ and $v_3$ shown in FIG. 15 extending over a plurality of regions $R_2$ and $R_3$, processing with respect to $v_2$ and $v_3$ is temporarily stopped upon reaching a scanning line $L_B$ corresponding to the boundary of regions, as shown in FIG. 18. At this point in time, therefore, only parts $v_{2a}$ and $v_{3a}$ of the segments $v_2$ and $v_3$ are completely processed. Remaining parts $v_{2b}$ and $v_{3b}$ are processed later on the basis of the new second intermediate signals. Thus, such operation is repeatedly performed with respect to segments extending along the subscanning direction.

The third intermediate signals obtained in the aforementioned manner are sequentially transmitted to the aligning memory 4 shown in FIG. 4 in the units of the respective regions.

E. Detail of Aligning Memory

Figure 19:
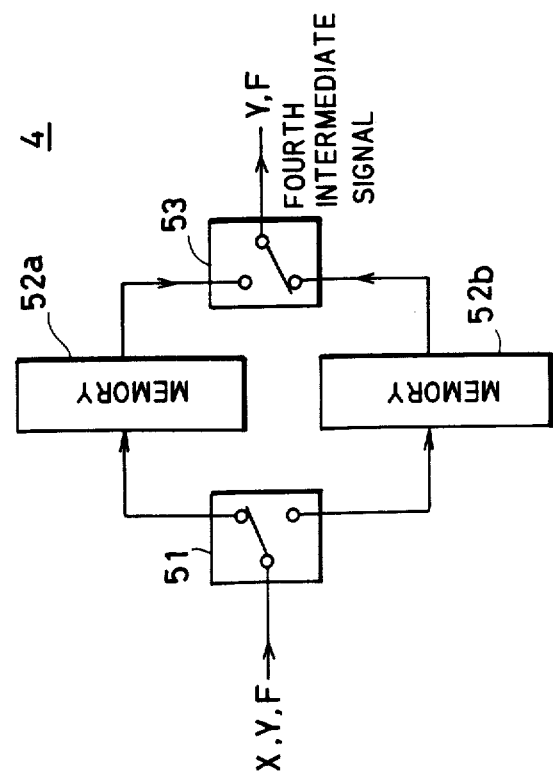
FIG. 19 is a detail block diagram of an aligning memory 4.

FIG. 19 is a detail block diagram of the aligning memory 4. As shown in FIG. 19, the aligning memory 4 is provided with two unit memories 52a and 52b and switching circuits 51 and 53 for alternately using the unit memories 52a and 52b for writing/reading. Each of the unit memories 52a and 52b has a prescribed number of buckets (not shown) each having memory capacity for one scanning line. Consequently, each of the unit memories 52a and 52b has memory capacity for $\Delta R$ lines. The main scanning coordinate calculating circuit 3 transmits the third intermediate signals with respect to the intersection points of the main scanning lines and the segments per regions $R_0, R_1, R_2, \ldots$ in the units of the respective segments v to the aligning memory 4. With reference to FIG. 18, data on the intersection points of the respective segments $v_1, v_{2a}$ and $v_{3a}$ are inputted in this sequence with respect to the region $R_2$.

Therefore, the third intermediate signals are inputted along the subscanning direction in the respective segments, while the entire input sequence is not along the subscanning direction. With reference to FIG. 18, an intersection point $k_P$ on the segment $v_1$ is inputted in advance to an intersection point $k_Q$ on the segment $v_2$. This is because the respective segments are sorted by the subscanning coordinates of the recording start points indicated by the white squares.

This aligning memory 4 has a function of aligning the inputted third intermediate signals in the subscanning direction by storing the third intermediate signals in addresses corresponding to the subscanning coordinates X thereof. Namely, when the third intermediate signals belonging to the region $R_2$ shown in FIG. 17 are inputted, the aligning memory 4 stores the same in addresses (buckets) in the unit memory 52a corresponding to the subscanning coordinates X through the switching circuit 51 shown in FIG. 19. Data with respect to intersection points belonging to the region $R_1$ are being read from the other unit memory 52b at this time.

Upon completion of such writing/reading, both of the switching circuits 51 and 53 are switched so that the write/read operations of the unit memories 52a and 52b take turns. Thus, the third intermediate signals with respect to the region $R_2$ stored in the unit memory 52a are read in sequence of subscanning addresses (bucket sequence) to be converted into fourth intermediate signals.

Since the fourth intermediate signals are read in the sequence of the subscanning addresses, the subscanning coordinates thereof can be recognized from the output sequence. Therefore, the fourth intermediate signals include no subscanning coordinates, but are formed by the main scanning coordinates Y and the flags F. In such reading interval, the third intermediate signals with respect to the region $R_3$ are being written in the other unit memory 52b. Similar operation is thereafter repeated so that the fourth intermediate signals are generated for every region $R_0$, $R_1$, ..., to be transmitted to the main scanning direction sorting circuit 5 shown in FIG. 4.

F. Detail of Main Scanning Direction Sorting Circuit

The fourth intermediate signals transferred from the aligning memory 4 are inputted in the main scanning direction sorting circuit 5 shown in FIG. 4, to be sorted in the main scanning direction. Namely, the fourth intermediate signals are permuted through the radix sorting method similar to sorting in the subscanning direction. Such sorting may be performed by permuting the fourth intermediate signals sequentially from that having the largest main scanning coordinate Y, and vice versa. Namely, ascending order and descending order can be selectively applied. Assumed in this embodiment is such a case wherein main scanning/recording is performed from the data having the largest Y since the run-length data calculating circuit 6 as hereinafter described is formed in cooerespondence to a case wherein the data are inputted sequentially from that having the largest main scanning coordinate. Therefore, the following description is made with respect to a case of sorting the signals sequentially from that having the largest main scanning coordinate Y, i.e., in a descending order.

Thus, the main scanning direction sorting circuit 5 may be formed by a circuit similar to the subscanning direction sorting circuit 2 while changing only the reading sequence, in principle. However, the fourth intermediate signals processed by the main scanning coordinate sorting circuit 5 are smaller in respective amount of information than the vector data processed by the subscanning direction sorting circuit 2. Therefore, the main scanning direction sorting circuit 5 performs radix sorting by directly transferring the fourth intermediate signals to be sorted between memories. Namely, since the "loading" is small in this stage, the "loading" itself is to be permuted without employing "cutforms". Therefore, no combined employment of the memory 12 and the sorting circuit 13 shown in FIG. 9 is performed, the sorting process is performed by only a circuit corresponding to the sorting circuit 13.

In the main scanning direction sorting circuit 5, the respective fourth intermediate signals are small in amount of information, while the number of the fourth intermediate signals is much larger than that of the vector data. Therefore, it is necessary to prevent delay in processing caused by such factors. Thus, the main scanning direction sorting circuit 5 is formed by a plurality of unit sorting circuits 5a as shown in FIG. 4. Each of the unit sorting circuit 5a sequentially performs writing of the fourth intermediate signals along the subscanning direction, thereby to perform sorting as hereinafter described. Fifth intermediate signals thus obtained are completely sorted and sequentially read along the subscanning direction. Such operation is repeated in each unit sorting circuit 5a.

As hereinafter described, run-length data RL are generated from the fifth intermediate signals. In a case of performing recording for, e.g., ten lines in parallel per each main scanning, the run-length data for ten lines may be transmitted in series to the recording output circuit portion 8. Alternatirely, ten run-length data calculating circuits 6 may be provided to transmit the run-length data RL in parallel to the recording output circuit portion 8.

FIG. 20 is a block diagram showing the unit sorting circuit 5a in detail. As is obvious from FIG. 20, the unit sorting circuit 5a in the main scanning direction is substantially similar in structure to the sorting circuit 13 with respect to the subscanning direction shown in FIG. 11. It is to be noted that the main scanning coordinates Y are also expressed by m-ary n-digit numerical values. The unit sorting circuit 5a is different from the circuit shown in FIG. 11 in that the fourth intermediate signals (Y, F) are employed as sorting data and no combined circuit 17 for combiing with the sequence indicating data N is present. Therefore, the inputted fourth intermediate signals are stored in buckets of a first sequential memory block 58a in response to the values of the least significant digits of the main scanning coordinates Y through an input buffer 55. Thereafter the fourth intermediate signals are transferred to a second sequential memory block 58b through a buffer 56 with a bidirectional register. The values of the fourth intermediate signals are compared sequentially from the lower order digits under control by a control circuit 59, and transferring is performed in response to the results of comparison. Reading and storage are repeated between the two sequential memory blocks 58a and 58b by a number of times responsive to the digit number n of the main scanning coordinates Y. Thereafter the fifth intermediate signals as the result of sorting of the fourth intermediate signals are output through an output buffer 57.

Figure 20A:
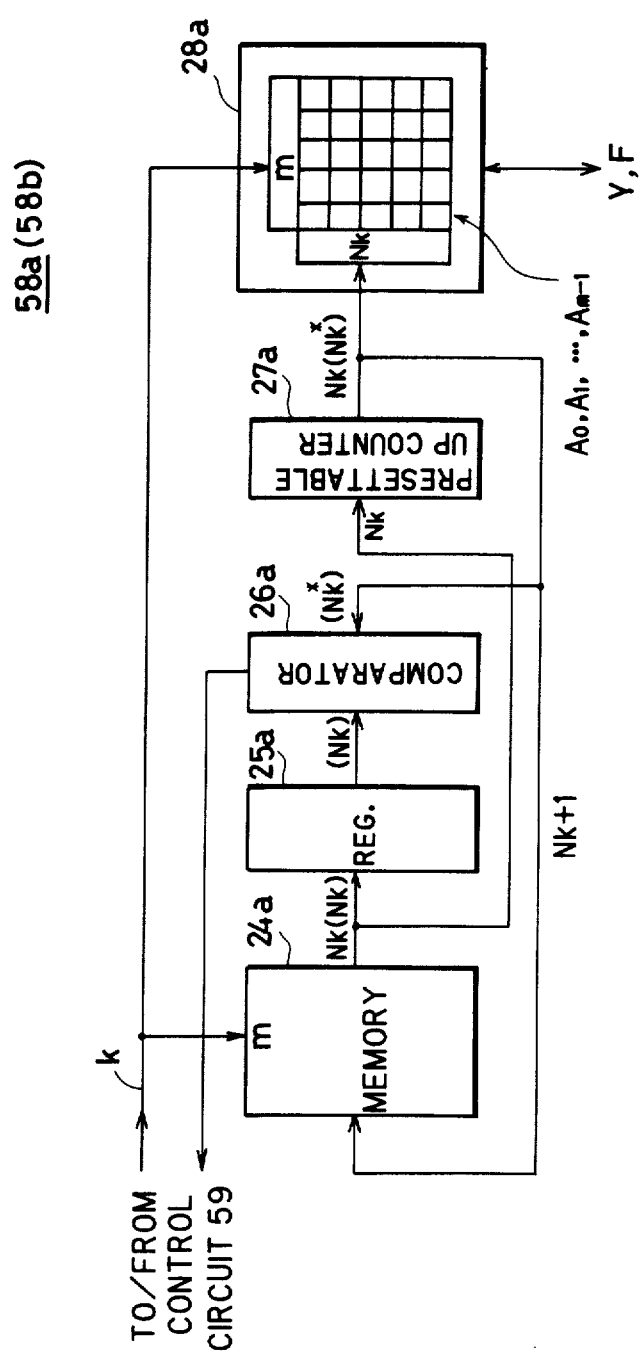

FIG. 20A shows internal structure of the sequential memory block 58a or 58b formed using FIFO rule. FIG. 20B shows a circuit formed using the FILO rule. These circuits adapted to sort the fourth intermediate signals as hereinabove described are similar in circuit structure and operation to those shown in FIG. 12 and FIG. 15. Namely, elements 24a to 28a and 31a to 33a in FIG. 20A and FIG. 20B correspond to the elements 24 to 28 and 31 to 33 in FIG. 12 and FIG. 15 respectively. Therefore, descriptions of FIG. 20A and FIG. 20B are omitted. However, it is to be noted that final reading is reversed in sequence from that shown in FIG. 7(d) or FIG. 8(d). Thus, the data are outputted in sequence from that having the largest main scanning coordinate.

G. Detail of Run-Length Data Calculating Circuit 6

Figure 22A:
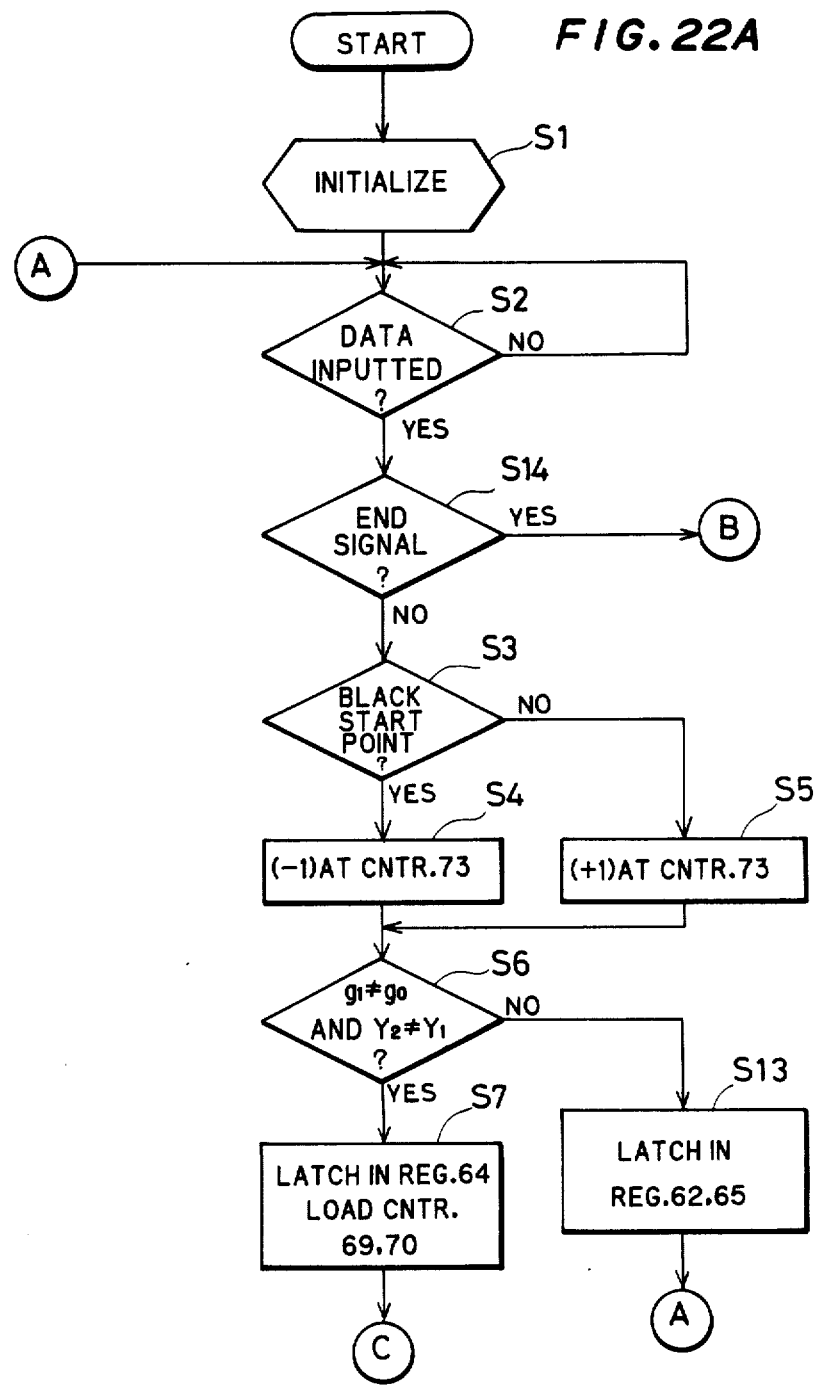
FIG. 22A to FIG. 22C are flow charts showing the operation of the run-length data calculating circuit.
Figure 22B:
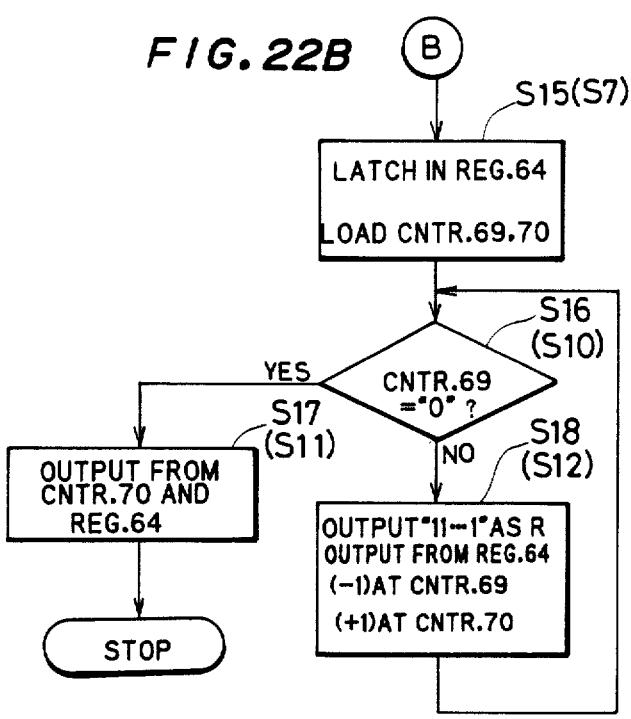
Figure 22C:
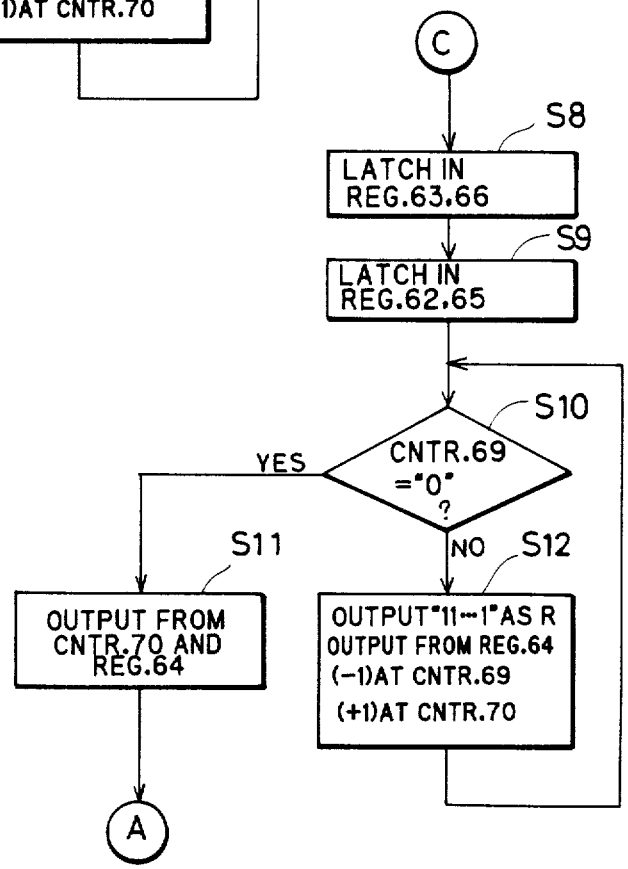

FIG. 21 is a block diagram showing details of the run-length data calculating circuit 6, and FIG. 22A to FIG. 22C are flow charts showing the operation thereof. Referring to FIG. 17, the run-length data calculating circuit 6 is provided with a run-length recording flag generator 210, a run-length data generator 220 and a control circuit 60. Within these circuits, the run-length recording flag generator 210 receives the flags F included in the fifth intermediate signals to generate run-length recording flag G indicating black and white recording by "1" and "0" respectively. The run-length data generator 220 receives the main scanning coordinates Y to generate data parts R within the run-length data. The control circuit 60 controls these circuits 210 and 220 while generating run-length line flag H. The fifth intermediate signals are inputted in sequence from that having the largest main scanning coordinate.

Figure 23A:
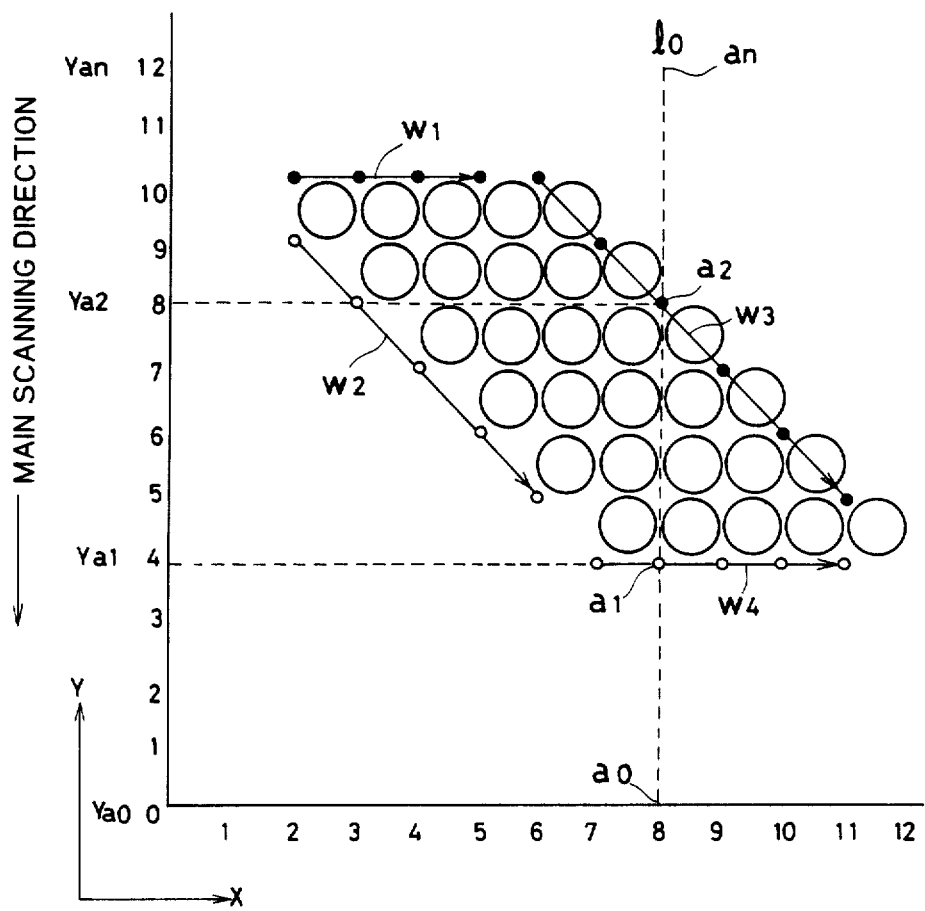
FIG. 23A and FIG. 23B are diagrams showing examples of recording images.

Description is now made of the basic function of the run-length data calculating circuit 6 before describing the aforementioned circuits in detail. FIG. 23A illustrates a figure pattern formed by vectors $w_1$ to $w_4$. Consider such a case of obtaining a recording image by filling the region enclosed by the vectors $w_1$ to $w_4$. The black circles on the vectors $w_1$ and $w_3$ denote intersection points of the vectors $w_1$ and $w_3$ and the scanning lines which are black start points when the main scanning is performed from larger main scanning coordinates. White circles on the vectors $w_2$ and $w_4$ denote intersection points which are black end points (white start points). As hereinabove described, such data are indicated by bits $F_1$ of the flag F.

When recording along a scanning line $l_0$ for example is considered in such a figure pattern, the run-length data calculating circuit 6 may obtain the following data:

(1) Data on "white" distance $(Y_{an} - Y_{a2})$ from scanning start point $a_n$ to intersection point $a_1$.

(2) Data on "black" distance $(Y_{a2} - Y_{a1})$ from intersection point $a_2$ to intersection point $a_1$.

Therefore, in case of only a figure pattern such as that shown in FIG. 23A, the run-length data calculating circuit 6 may be formed by a subtractor for performing subtraction between the main scanning coordinates of two intersection points adjacent to each other along the scanning line direction, and a circuit for discriminating the values of the bits $F_1$ of the flag F.

Figure 23B:
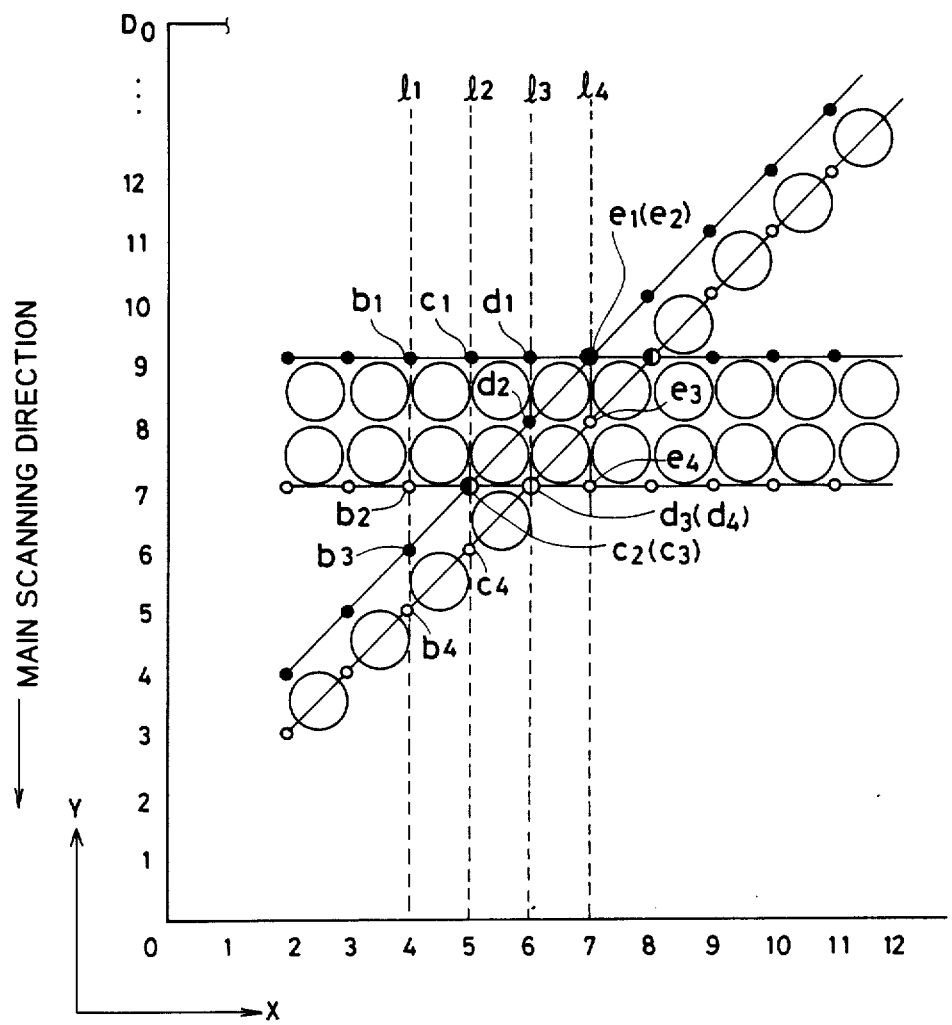

However, overlapping of vectors as shown in FIG. 23B may be present in a figure pattern to be recorded in practice, and hence it is necessary to obtain run-length data in consideration of the same. When run-length data are obtained only on the basis of mutual relation between the aforementioned adjacent two intersection points in this case, the recording efficiency may be lowered. Considering recording along a scanning line $l_2$ for example, run-length between intersection points $c_1$ to $c_2$ and run-length data between other intersection points $c_3$ to $c_4$, the point $c_3$ overlapping with the intersection point $c_2$, are separately outputted in the aforementioned simple method. However, "black" may be sustained from the intersection point $c_1$ to the intersection point $c_4$ in practice, whereby only the distance data from $c_1$ to $c_4$ are required as the run-length data. In FIG. 23B, overlapping of intersection points is denoted by circles divided in two and overlapping modes of black start points and black end points are denoted by black/white in respective semicircles.

In consideration of such circumstances, the run-length data calculating circuit 6 in this embodiment is formed to discriminate mutual relation between the main scanning coordinate Y and the flag F of each of three or more intersection points continuous on respective scanning lines within the inputted fifth intermediate signals, thereby to generate the run-length data parts R and the run-length flags G.

Figure 24:
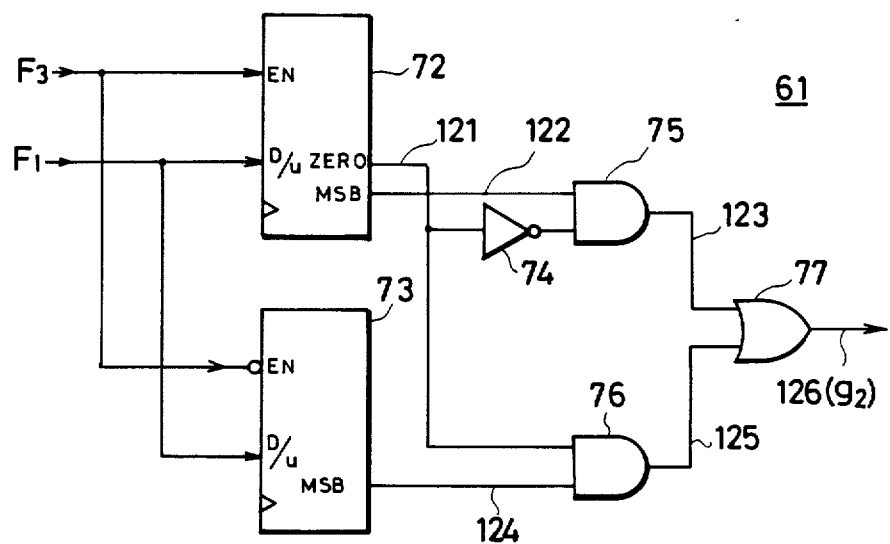
FIG. 24 is a detail diagram of a flag accumulating circuit 61.

On the basis of such knowledge, description is now made of the structure and operation (FIG. 22A to FIG. 22C) of the run-length data calculating circuit 6 as shown in FIG. 21. Within the fifth intermediate signals inputted in the run-length data calculating circuit 6, the flags F are fetched in a flag accumulator 61. As shown in FIG. 24, the flag accumulator 61 has two up/down counters 72 and 73. The counter 72 is activated when a bit $F_3$ in the flag F for forcibly starting or ending "white" recording is "1". On the other hand, the counter 73 is activated when the flag $F_3$ is "0" for performing general recording. In order to facilitate understanding, the following description is made on the assumption that the flag $F_3$ is "0". Operation in case of $F_3 = $"1" will be described later.

When $F_3 = $"0", the bit $F_1$ within the flag F is fetched in the counter 73. $F_1 = $"1" indicates a black start point and $F_1 = $"0" indicates a black end point, respectively. The counter 73 is initialized at, e.g., "000" before starting of input with respect to the respective scanning lines (step S1 in FIG. 21A). In addition, the registers 62 and 63 are initialized at white start signals "0" and registers 65 and 66 are initialized at main scanning start addresses "$D_0$" respectively at the step S1. Upon data input with respect to one intersection point, the process is advanced from a step S2 to a step S14, which step S14 becomes "NO" and hence the process is further advanced to a step S3. In case of $F_1 = $"1", i.e., in case of a black start point, the counter 73 is decremented by $(-1)$ (steps S3 and S4). In case of $F_1 = $"0", on the other hand, the counter 73 is incremented by $(+1)$ (steps S3 and S5).

Figure 25:
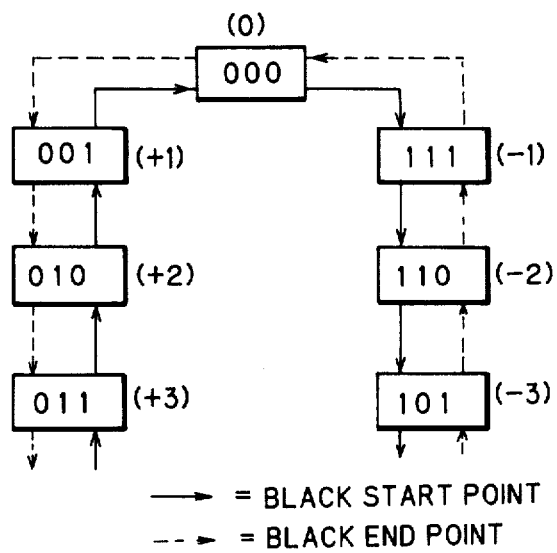
FIG. 25 is a diagram for illustrating an accumulation rule of a flag $F_1$.
Figure 26A:
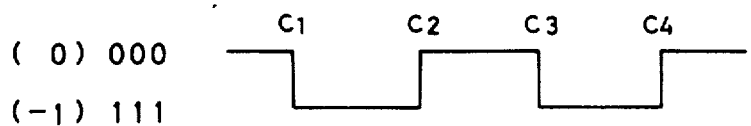
FIG. 26A and FIG. 26B are diagrams illustrating examples of accumulation of the flag $F_1$.
Figure 26B:
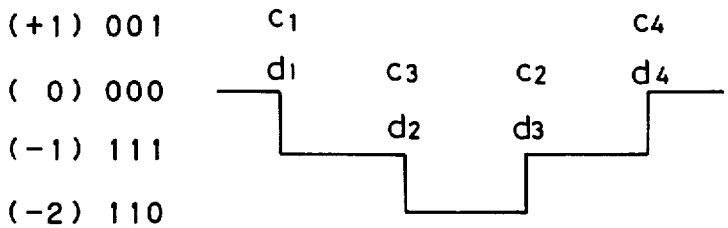

Such up/down operation is performed every time the fifth intermediate signal for each intersection point is inputted, and FIG. 25 shows the relation of the operations. Every time the black start point is inputted starting from "000", the count-down as shown by the solid line in FIG. 25 is performed step by step. Every time a black end point is inputted, count-up as shown by the broken line is performed step by step. In FIG. 25, the count values are also indicated by numerals $(-3)$ to $(+3)$ for facilitating understanding. Therefore, when the flags $F_1$ of the respective intersection points $c_1$ to $c_4$ with respect to the scanning line $l_2$ of FIG. 23B, for example, are sequentially inputted, the count values of the counter 73 are changed as shown in FIG. 26A or 26B. The difference between FIG. 26A and FIG. 26B corresponds to which one of $c_2$ and $c_3$ is inputted first. FIG. 26B shows the change with respect to a scanning line $l_3$.

Referring to FIG. 24, the most significant bit of the count values of the counter 73 is outputted as a signal 124 to an AND circuit 76. On the other hand, two output signals 121 and 122 are outputted from the other counter 72. Within the output signals 121 and 122, the output signal 121 has the value of "1" when the count value of the counter 72 is "0". The output signal 122 has the value of the most significant bit of the count values of the counter 72. Therefore, during a time when the counter 72 was reset at "000" in an initial state and the flag $F_3$ is inputted in "0", the signal 121 is "1" and the signal 122 is "0". Thus, an output signal 125 from the AND circuit 76 has a value identical to the output signal 124 from the counter 73. Further, an output signal 123 from an AND circuit 75 becomes "0", whereby an output signal (flag accumulation signal) 126 from an OR circuit 77 is identical in value to the signal 125. Namely, during a time when the count value of the counter 72 is "0", the accumulator 61 of FIG. 24 is equivalent to a case wherein only the counter 73 is provided.

The flag accumulation signal 126 output from the flag accumulator 61 of FIG. 21 each time a fifth intermediate signal with respect to an intersection point is inputted is sequentially transferred to registers 62, 63 and 64 in accordance with a rule as hereinafter described, to be latched in the registers 62, 63 and 64. This rule corresponds to steps S6 to S13 or steps S6 to S9 in FIGS. 22A and 22C. For the convenience of illustration, the flag accumulation signal 126 is indicated by $g_2$ and values respectively latched in the registers 62 and 63 are expressed by $g_1$ and $g_0$.

On the other hand, the main scanning coordinates Y with respect to the respective intersection points sequentially inputted in the run-length data generator 220 shown in FIG. 21 are transferred to registers 65 and 66 by a similar rule as hereinafter described (steps S6 to S13 or steps S6 to S9) to be latched therein. A comparator 67 is adapted to compare a main scanning coordinate value $Y_2$ inputted at the shown point of time with a main scanning coordinate value $Y_1$ being latched in the register 65, to supply a coincidence signal 127 to the control circuit 60 upon coincidence of the values of $Y_1$ and $Y_2$. A subtractor 68 is adapted to obtain a difference $(Y_0-Y_1)$ between main scanning coordinate values $Y_0$ and $Y_1$ respectively latched in the registers 65 and 66. Since the main scanning coordinate values are expressed in 24-bits in this embodiment, the difference $(Y_0-Y_1)$ also has a 24-bit data length. On the other hand, the data part R in the run-length data RL are expressed in 14-bits shown in FIG. 27. Therefore, 10 higher order bits within 24 bits of the result of substraction $(Y_0-Y_1)$ in the subtractor 68 are loaded in an up/down counter 69 while the 14 lower order bits are loaded in an up/down counter 70. Further, these data are processed along procedures as hereinafter described, to attain consistency between these data.

On the premise of such state, description is now made on the entire operation of the circuit shown in FIG. 21. After the processing of steps S1 to S5 in FIG. 22A is performed as hereinabove described, the control circuit 60 determines whether or not (1) $g_1 \neq g_0$ and (2) $Y_2 \neq Y_1$ at a subsequent step S6. Upon holding of the conditions (1) and (2), the process is advanced from the step S6 to a step S7 and the following steps, whereby the run-length data are outputted. When either the condition (1) or (2) does not hold, a step S13 is executed. The condition (1) means that the most significant bit g is changed from "0" to "1" or from "1" to "0" as is obvious from FIG. 25. In other words, it means that the total number $n_B$ of the black start points and the total number $n_W$ of the black end points within the respective inter-section points inputted to the point of time are inverted in a large-small relation. With reference to the scanning line $l_2$ of FIG. 23B, for example, such an inversion takes place in respective points of $c_1$ to $c_4$ or $c_1$ and $c_4$ as is obvious from FIG. 26A and FIG. 26B. Further, with respect to the scanning line $l_3$ of FIG. 23B, the inversion takes place in the points $c_1$, $c_4$, $d_1$ and $d_4$.

On the other hand, the condition (2) is that for judging whether or not main scanning coordinates of intersection points inputted in advance and intersection points subsequently inputted are different from each other. Namely, detected is such a case wherein the main scanning coordinate of a previously inputted intersection is equal to that of a subsequently inputted intersection point and hence black recording is not required to be ended or started at this point in practice (e.g., intersection point $c_2$ in FIG. 23B). Therefore, the step S6 is satisfied upon input of three or more fifth intermediate signals for intersection points at which black recording is to be started or ended in practice judging from mutual relation between the main scanning coordinates Y and the flags $F_1$ of the respective intersection points.

When the conditions at the step S6 are satisfied, the process is advanced to a subsequent step S7, whereby the data $g_0$ are latched in the register 64 by a control signal 130 from the control circuit 60. Further, the counters 69 and 70 are made to load subtraction output $(Y_0-Y_1)$ of the subtractor 68 at this step S7. At a subsequent step S8, the registers 63 and 66 are made to latch $g_1$ and $Y_1$ respectively by latch signals 129. At a step S9, further, the registers 62 and 65 are made to latch $g_2$ and $Y_2$ by latch signals 128. Therefore, the data $g_0$ to $g_2$ and the main scanning coordinates $Y_0$ to $Y_2$ are sequentially shifted rightwardly in FIG. 21 through these steps S7 to S9.

The data thus latched in the register 64 and those loaded in the counters 69 and 70 are outputted as the run-length recording flags G and the run-length data parts R, respectively. Since the coordinate values and the run-length data parts R are different in data length from each other as hereinabove described, the following procedures are introduced in the output operation thereof. First, a determination is made at a step S10 in FIG. 22C as to whether or not the count value of the counter 69 is "00 ... 0". When the count value is "00 ... 0", all of the 10 higher order bits of the run-length data parts R are "0", and hence the 14 lower order bits being the count values of the other counter 70 are outputted as the run-length data parts R (step S11). Further, the values latched in the register 64 at the step S12 are outputted as the run-length recording flags G.

On the other hand, when the count value of the counter 69 is not "00 ... 0" at the step S10, the switching circuit 71 is switched. Thus, signals in which all of the 14 lower order bits are "1" are outputted as the run-length data parts R and the data latched in the register 64 are outputted as the run-length recording flags G (step S12). Then the counter 69 is made to count down by $(-1)$ and the counter 10 is made to count up by $(+1)$ by control signals 130. These steps S10 and S12 are repeated untill the count value of the counter 69 becomes "0".

Namely, the run-length data parts R are outputted by $(2^{14}-1)=$"111 ... 1" and a value corresponding to $2^{14}$ within $(2^{14}-1)$ is substrated from the counter 69 upon every such output. Further, $(+1)$ is added to the counter 70 as compensation corresponding to the part of $(-1)$. These operations are performed to make adjustment with respect to the division of the data.

When the counter value of the counter 69 becomes "00 ... 0" by repetition of these processing steps, the remaining count values of the counter 70 are outputted at a step S11 to proceed to new data input. In FIG. 21, the signal 131 from the counter 70 to the counter 69 represents a carry signal of the counter 70. This signal 131 is employed for compensation in a case wherein (+1) is added to the counter 70 at the step S12 when the count value of the counter 70 is "11 ... 1". Namely, when the values to be held overflow the capacity of the counter 70, the counter 69 is made to count up thereby to make adjustment for such an overflow.

When the conditions of the steps S6 shown in FIG. 22A are thus satisfied, the data $g_0$ to $g_2$ and the main scanning coordinates $Y_0$ to $Y_2$ are successively transferred to generate the run-length data RL. Such operation takes place when the black start points and black end points are alternately arrayed without causing overlapping of the main scanning coordinates thereof, such as the scanning line $l_1$ in FIG. 23B.

When, on the other hand, the conditions of the steps S6 are not satisfied, i.e., when at least either $g_0 \neq g_1$ or $Y_2 \neq Y_1$ does not hold, only latches of the registers 62 and 65 are performed at a step S13 to proceed to new data input. Namely, in such a case, change of the recording condition, i.e., starting or ending of black recording is not caused on the intersection points or main scanning coordinates of continuously inputted two intersection points are identical to each other, whereby no new run-length data RL are generated in these intersection points.

Within these conditions, the condition of $g_0 = g_1$ is caused at, e.g., an intersection point $e_2$ on a scanning line $l_4$ in FIG. 23B. The condition of $Y_1 = Y_2$ is caused at intersection points $c_2$ ($c_3$) and $d_3$ ($d_4$), for example. Although it is not necessary to generate new run-length data RL or the like on the intersection points, the run-length data RL must be generated by input of a subsequent intersection point $c_4$ with respect to an intersection point such as $c_2$ ($c_3$) as shown in FIG. 23B. Therefore, the data with respect to the intersection point $c_1$, i.e., the values $g_0$ and $Y_0$ latched in the registers 63 and 66 of FIG. 21 are held in the latched states. With respect to the scanning line $l_2$ in FIG. 23B, the run-length data parts R are obtained by finding the difference between the main scanning coordinates of the intersection points $c_1$ and $c_4$. Since the fifth intermediate signals are inputted in sequence from that having the largest main scanning coordinate in this embodiment, $(Y_0 - Y_1)$ are positive in values, whereby the same can be directly employed as the run-length data parts R.

FIGS. 28A to FIG. 28D are diagrams showing states of transferring of main scanning coordinates $Y_0$ to $Y_2$ and data $g_0$ to $g_2$ with respect to the scanning lines $l_1$, $l_2$, $l_3$ and $l_4$ respectively. In these drawings, symbol $D_0$ denotes initial values. Numerals with parentheses denote count values of the counter 73 of FIG. 24 at the point of time of generation of the data g0 to g2. As is obvious from FIG. 28A to FIG. 28D, when conditions of $Y_1 \neq Y_2$ and $g_0 \neq g_2$ are not satisfied, i.e., in case of $Y_1 = Y_2$ and/or $g_0 = g_1$ as shown by slant lines in FIG. 28A to FIG. 28D, data transfer is suppressed thereby to prevent generation of substantially meaningless run-length data.

Figure 27:
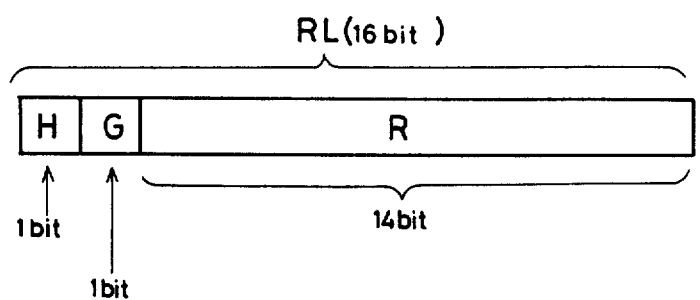
FIG. 27 is a diagram illustrating the data format of run-length data.

The run-length line flags H outputted from the control circuit 60 of FIG. 21 are flags set in response to a line feed signal 132 to indicate the head run-length data upon shifting of scanning to a subsequent subscanning line. The flags H are assigned to the most significant bit of the run-length data RL as shown in FIG. 27.

When a subsequent line feed signal is transmitted to the run-length calculation circuit 6 of FIG. 21, the control circuit 60 recognizes that no new fifth intermediate signals with respect to one main scanning line are inputted. Then the control circuit 60 generates the signal 130 to latch the signal $g_0$ in the register 64 while loading the output of the subtractor 68 in the counters 69 and 70. Thus, the run-length data RL are generated as hereinabove described. Then the process is advanced from the step S14 of FIG. 22A to a step S15 of FIG. 22B. The steps S15 to S18 are identical to the steps S7, S10, S11 and S12 respectively, and hence description thereof is omitted with parenthesis being assigned to indicate correspondence.

Through these operations, output of the run-length data RL on one main scanning line is completed. With respect to a subsequent main scanning line, the routine is started from the start of FIG. 22A.

Description is now made of treatment of the forced white recording flag $F_3$. When the flag $F_3$ is inputted as "1" in the flag accumulator 61 shown in FIG. 24, the counter 72 is activated and the counter 73 is deactivated. The flag $F_1$ is counted in the counter 72. When the result of counting is other than "00 ... 0", the output signal 121 becomes "0". The output signal 122 has a value corresponding to the most significant bit of the count value. Similarly to the counter 73, the counter 72 is adapted to count up by $(+1)$ when the flag $F_1$ is "0" and count down by $(-1)$ when the flag $F_1$ is "1". Therefore, when $F_1 = $ "0" is inputted, the count value of the counter 72 is changed, e.g., from "000" to "001" and both of the signals 121 and 122 become "0" to sustain such a state by the fact that the intersection point is a forced black end point (forced white start point), i.e., $F_3 = $ "1". Therefore, the output signal 123 through an inverter 74 and the AND circuit 75 is "0". Further, through the fact that the signal 121 is "0", the signal 125 also becomes "0", whereby the output 126 ($g_2$) from the OR circuit 77 is "0".

Figure 29:
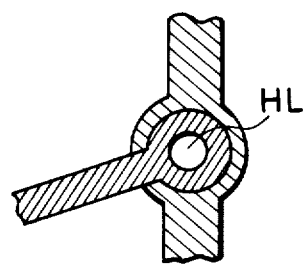
FIG. 29 is an explanatory diagram of forced white recording.
Figure 28A:
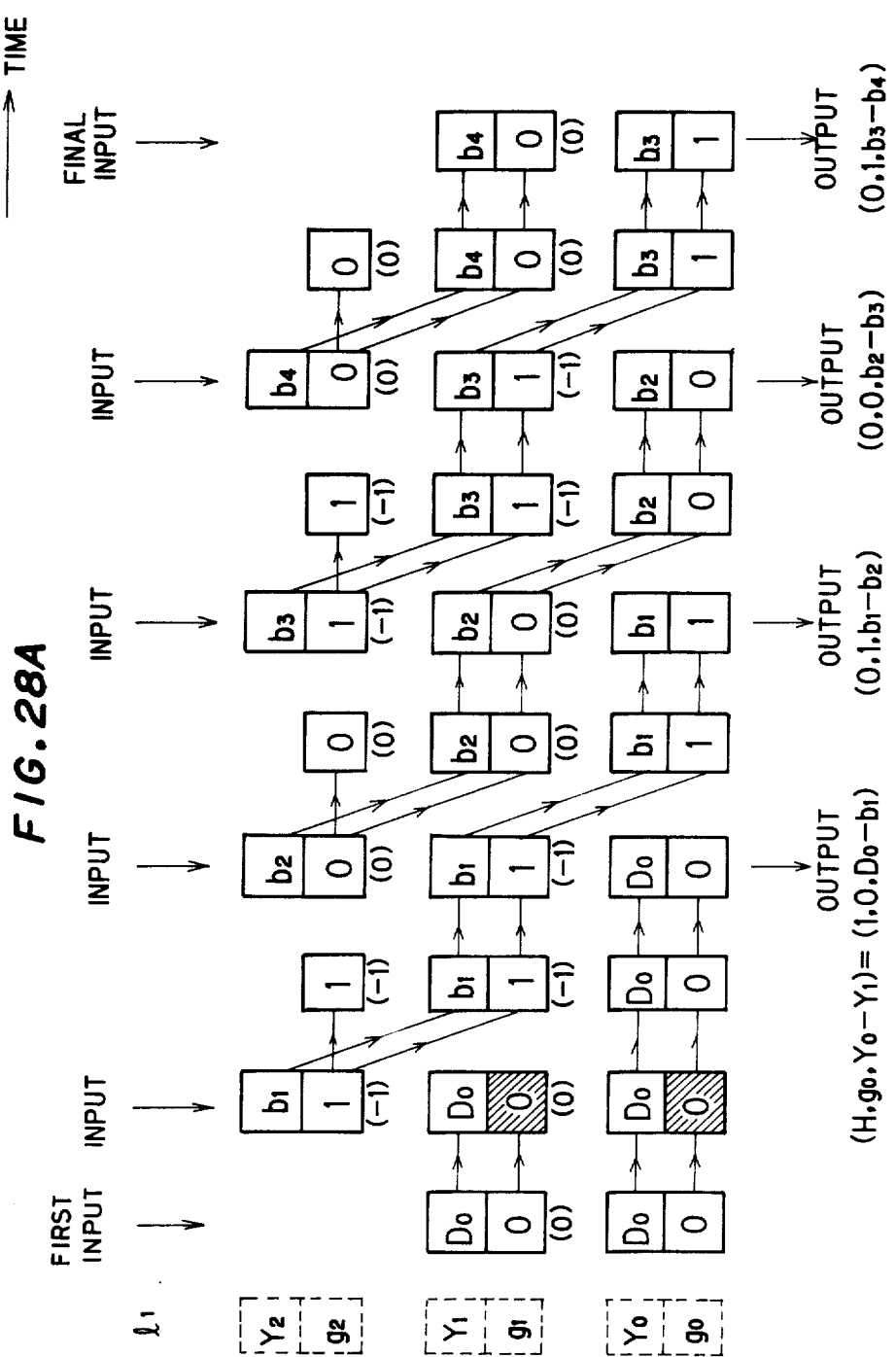
Figure 28B:
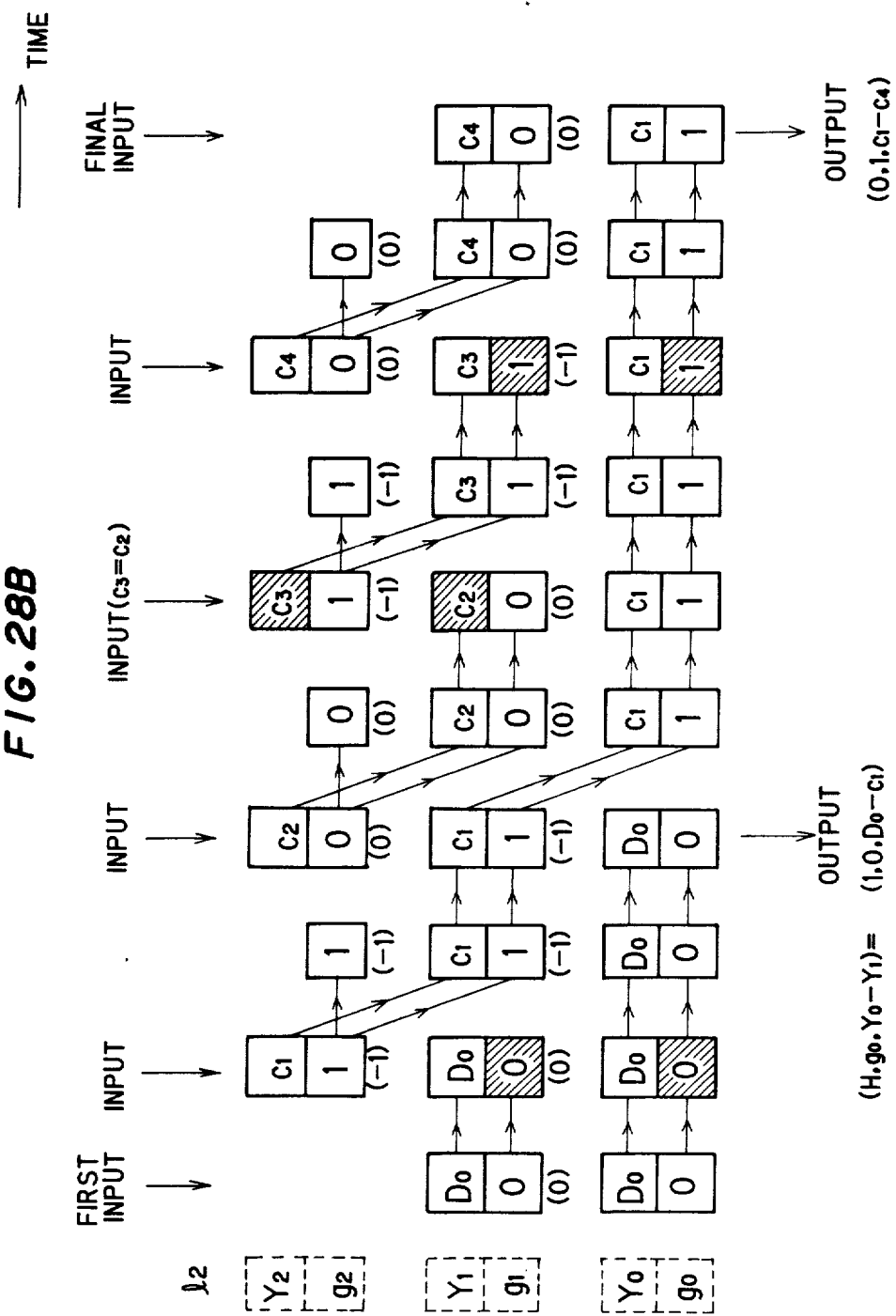

Therefore, when the forced white recording flag $F_3$ is "1", white recording can be forcibly started, i.e., black recording can be forcibly completed from the intersection point regardless of the mode of overlapping of figures in the scanning line. When the fifth intermediate signals having the flags $F_3 = $ "1" and $F_1 = $ "1" are subsequently inputted while the signals 121 and 122 both remain in "0" states, the count value of the counter 72 is returned to "000", whereby the signal 121 becomes "1". This signal 121 is supplied to the AND circuit 75 through the inverter 74. The output 123 of the AND circuit 75 becomes "0", and the signal 126 becomes indentical to the output 124 of the counter 73. Thus, the forced white recording is completed. In such a manner, white recording of holes HL shown in FIG. 29 or the like can be easily performed by employing the flag F even if a plurality of patterns are overlapped in pattern recording of an IC substrate or the like.

The counter 73 is adapted to continue accumulation when the fifth intermediate signal having $F_3 = $ "0" is inputted even if forced white recording is being performed.

H. Conclusion of Embodiment

The run-length data RL obtained in the aforementioned manner are decoded by the run-length decoder 7 shown in FIG. 4. The recording output circuit portion 8 exposes to record desired figure patterns on a photographic film or the like on the basis of the decoded data.

Figure 1A:
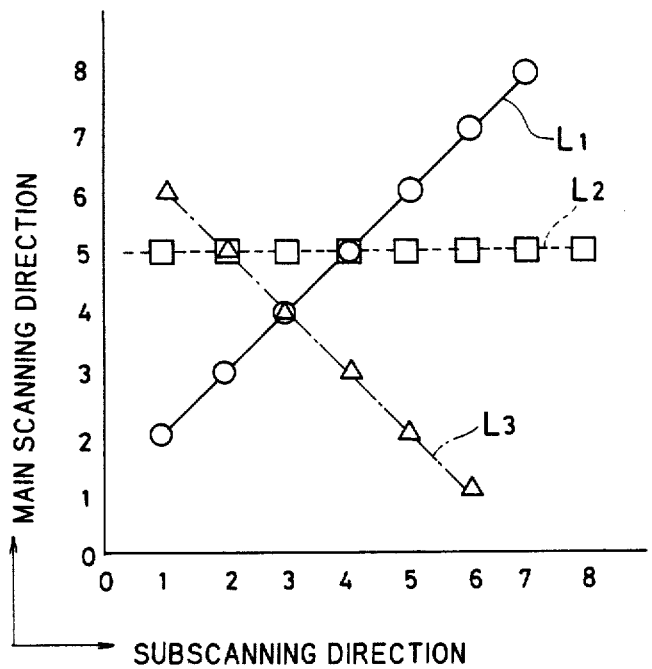
FIGS. 1A and 1B are schematic diagrams illustrating sorting of vector data.
Figure 1B:
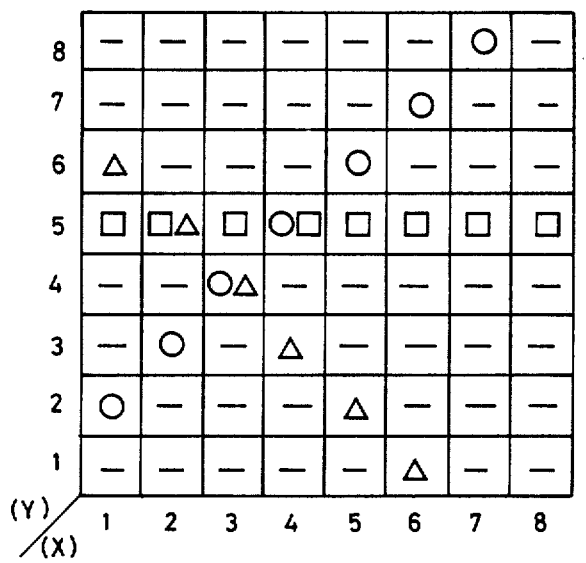
Figure 2:
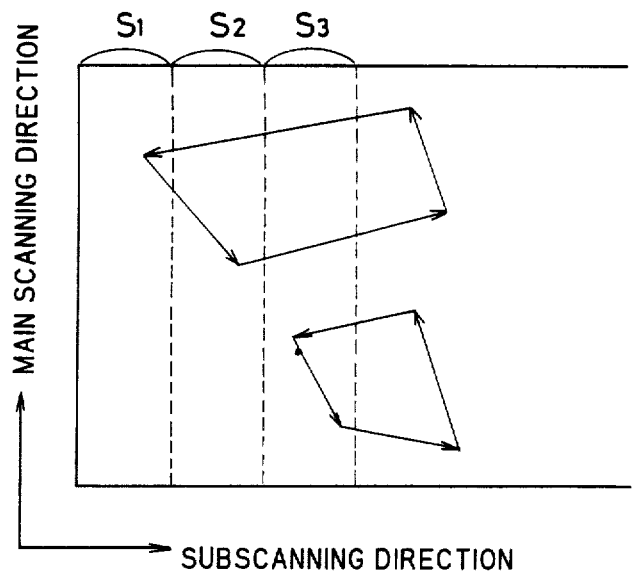
FIG. 2 is an explanatory diagram of a classification memory.

In such consecutive processing, it is to be noted that no memory is employed in one-to-one correspondence to the pixels on the recording plane as shown in FIG. 1B. Namely, although the subscanning direction sorting circuit 2 of FIG. 4 sorts the recording start points in the subscanning direction, the memory capacity required therefor is not in correspondence to the number of pixels on the recording plane, but to the number of the vectors. Thus, the required memory capacity may be considerably smaller than the total pixel number even in recording of extremely complicated figure patterns. Therefore, the memory capacity may be considerably small also with respect to an output area of about $2^{24} \times 2^{24}$ as supposed in this embodiment. However, the present invention is also applicable to recording of a relatively small recording plane such as that having an output area of $2^{16} \times 2^{16}$, and is not restricted to the aforementioned output area.

Figure 30:
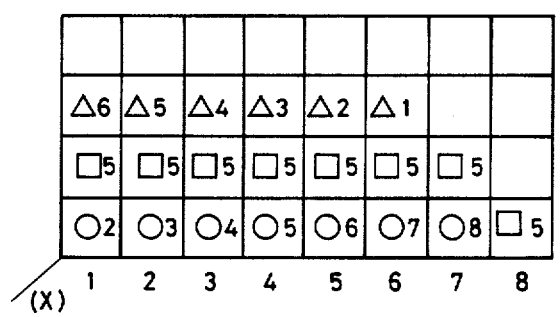
FIG. 30 is an schematic diagram illustrating a strage region required in the embodiment of the present invention.

The coordinate data on the respective intersection points as obtained through the main scanning coordinate calculating circuit 3 of FIG. 4 are also in data amount responsive to the number of the vectors with respect to the main scanning direction, as shown in FIG. 30, for example. Therefore, there is no need to prepare memory regions with respect to pixels (assigned with "—" in FIG. 1B) where no vectors are passing, contrary to that shown in FIG. 1B. Areas are divided per several lines with respect to the subscanning direction to alternately store the data with respect to the same, whereby the memories 41a and 41b in FIG. 16 may be small in memory capacity. This also applies to the aligning memory 4.

As to the main scanning direction sorting circuit 5, sorting is also performed per line through the plurality of unit sorting circuits 5a and the number of the vectors present on each line is smaller than the total pixel number, whereby the memory capacity thereof may be also small. The run-length data calculating circuit 6 requires no mass storage memory either.

According to this embodiment, the memory capacity can be reduced to enable high-speed processing because the radix sorting method is employed. Namely, if such sorting method is not employed, mass storage memories are required in sorting, leading to a decrease in the processing speed. Further, preferable effects are obtained in this embodiment by employing the processing per several lines in the subscanning direction as hereinabove described, to provide a further efficient image data processing apparatus.

I. Modifications (1) Although the radix sorting method is employed in both of the subscanning and main scanning directions in the preferred embodiment, the radix sorting method may be employed only in the main scanning direction in a case wherein already sorted vector data are inputted in the subscanning direction, for example. The radix sorting method may be employed only in the subscanning direction, to the contrary.

(2) In a case of applying the radix sorting method also to the main scanning direction sorting circuit 5, the processing speed is increased as the number of the unit sorting circuits 5a is increased. In this case, each unit sorting circuit 5a may be small in memory capacity, and hence no problem of increase in memory capacity is caused even if the number of the unit sorting circuits 5a is increased. Permutation may be performed in sequence from the smallest main scanning coordinate in sorting in the main scanning direction, i.e., in ascending order, and, in this case, a modification of making the subtractor 68 of FIG. 21 perform calculation of $(Y_1 - Y_0)$ or the like may be applied.

(3) Although the preferred embodiment is directed to the case of performing image processing on the basis of the vector data supplied from the host computer to perform recording by run-length data, the present invention is applicable to general image processing of sorting segments in arbitrary forms. Therefore, the present invention can also be applied to an apparatus for performing recording by dot images or the like.

According to the present invention as hereinabove described, radix sorting is performed in sorting of supplied segment data in the main scanning direction and/or subscanning direction to reduce the memory capacity, whereby an image data processing method which can perform highly efficient image data processing at a high speed and an apparatus therefor can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data processing method of sequentially inputting first vector data expressing segments included in desired image patterns for providing image data for recording said image patterns through scanning on the basis of said first vector data, said recording through being performed by a combination of main scanning and subscanning, said first vector data including a main scanning coordinate and a subscanning coordinate of a least one terminal point of said segments, said image data processing method comprising:

a first step of sequentially inputting said first vector data and performing radix sorting of said first vector data on the basis of said subscanning coordinate of said terminal point thereby to provide corresponding second vector data permuted along a subscanning direction;

a second step of obtaining coordinate values of intersection points of said segments and main scanning lines on the basis of said second vector data and sequentially output respective main scanning coordinate values of said intersection points in a sequence corresponding to respective subscanning coordinates of said intersection points;

a third step of sorting said main scanning coordinate values of said intersection points along said main scanning direction and, in response, permuting said main scanning coordinate values into a permuted sequence of main scanning coordinate values, and outputting said permuted main scanning coordinate values; and a fourth step of generating and outputting image data in response to said permuted main scanning coordinate values of said intersection points.

2. An image data processing method in accordance with claim 1, wherein said subscanning coordinate of said terminal point is expressed by m-ary n-digit numerical data, and said first step includes:

(a) a first process of designating digits of said numerical data in a sequentially increasing order;

(b) a second process of alternately or cyclicly selecting a memory block per designated digit from a plurality of memory blocks each having m storage regions capable of storing said numberical data;

(c) a third process of sequentially writing said numerical data in any of said storage regions of a selected memory block in response to the value of a designated digit within values of said numerical data;

(d) a fourth process of reading said numerical data from said selected memory block in sequence responsive to a subsequently designated digit;

(e) a fifth process of repeating said third and fourth processes n times in synchronization with said digit designation; and (f) a sixth process of sequencing said first vector data in accordance with a sequence of said numerical data upon repetition of said third and fourth processes by n times thereby to generate said second vector data and sequentially output the same.

3. An image data processing method in accordance with claim 2, wherein
said first step further includes:
(g) a process of providing said numerical data with accompanying data for associating said numerical data with respective ones of said first vector data in advance of said first process; and
(h) an process of storing said first vector data in a first vector data memory in relation with said accompanying data,
said writing and said reading are performed with respect to sets of said numerical data and said accompanying data, and
said second vector data are generated by reading said first vector data from said first vector data memory in accordance with a sequence of said accompanying data upon completion of said repetition by n times.

4. An image data processing method in accordance with claim 3, wherein
said accompanying data have values responsive to a sequence of input of said first vector data, and
said first vector data are stored in a memory space having sequential addresses, each of said first vector data stored at an address of said memory space responsive to said input sequence within said first vector data memory.

5. An image data processing method in accordance with claim 1, wherein
said recording through scanning is exposure recording on a photosensitive material,
said main scanning coordinate data of said intersection points are accompanied with flags indicating whether said intersection points are assumed to be exposure start points or exposure end points, and
said fourth step is executed by obtaining run-length data on the basis of said main scanning coordinate values of said intersection points and said flags to output said run-length data as image data for said recording through scanning.

6. An image data processing method in accordance with claim 5, wherein
said run-length data are obtained by sequentially accumulating said flags with respect to intersection points having the same subscanning coordinate along the main scanning direction to obtain differences between main scanning coordinate values of said intersection points in response to the results of said accumulation.

7. An image data processing method in accordance with claim 1, wherein
said second step is performed per partial region having a prescribed width in the subscanning direction.

8. An image data processing method in accordance with claim 1, wherein
said first vector data includes the main scanning coordinate and the subscanning coordinate of a terminal point corresponding to a recording start point of said segment.

9. An image data processing method in accordance with claim 1, wherein
said third step is executed by performing radix sorting on the basis of said scanning coordinate values of said intersection points.

10. An image data processing method in accordance with claim 9, wherein
said main scanning coordinates of said intersection points are expressed as m-ary n-digit numerical values, and
said radix sorting in said third step is performed by:
a process of designating digits of said main scanning coordinates in sequence from the lower order;
a process of alternately or cyclicly selecting a memory block per designated digit from a plurality of memory blocks each having m storage regions capable of storing said main scanning coordinates;
a process of sequentially writing said main scanning coordinates in any of storage regions of a selected memory block in response to the value of a designated digit within said values of said main scanning coordinates;
a process of reading said main scanning coordinates from said selected memory block in sequence responsive to a subsequently designated digit;
a process of repeating writing in and reading from said memory blocks n times in synchronization with said digit designation; and
a process of sequentially outputting said main scanning coordinates upon repetition of said writing and reading by n times.

11. An image data processing apparatus for sequentially inputting first vector data expressing segments included in desired image patterns for providing image data for recording said image patterns through scanning on the basis of said first vector data, said recording through scanning being performed by a combination of main scanning and subscanning, said first vector data including a main scanning coordinate and a subscanning coordinate of at least one terminal point of said segments, said image data processing apparatus comprising:
first sorting mean for radix sorting said first vector data on the basis of said subscanning coordinate of said terminal point thereby to provide second vector data permuted in a sequence corresponding to the direction of said subscanning;
intersection point coordinate operating means for obtaining coordinate values of intersection points of said segments and main scanning line on the basis of said second vector data to sequentially output said main scanning coordinate values of said intersection points in a sequence corresponding to a sequence of said subscanning coordinates of said intersections points;
second sorting means for sorting said main scanning coordinate values of said intersection points to output said main scanning coordinate values in accordance with a sequence permuted by sorting along said main scanning direction; and
image data generating means for generating and outputting image data in response to said main scanning coordinate values of said intersection points outputted from said second sorting means.

12. An image data processing apparatus in accordance with claim 11, wherein
said main scanning coordinate of said terminal point is expressed by m-ary n-digit numerical data, and
said first sorting means includes:
(a) a plurality of first memory blocks each having m storage regions capable of storing said numerical data;
(b) first digit designating means for designating digits of said numerical data in an ascending order;
(c) first memory block selecting means for alternately or cyclicly selecting a one of said first memory blocks per digit designated by said first digit designating means from said plurality of first memory blocks;
(d) first write means for sequentially writing said numerical data in any of said storage regions of a selected one of said first memory blocks in response to the value of a digit designated by said first digit designating means within values of said numerical data;
(e) first read means for reading said numerical data from said selected one of said first memory blocks in a sequence responsive to a subsequently designated digit;
(f) first repeating means for repeating said writing and said reading n times in synchronization with a digit designation by said first digit designating means; and
(g) first sequencing means for sequentially outputting said numerical data upon repetition of said writing and said reading by n times thereby to generate said second vector data and sequentially output the same.

13. An image data processing apparatus in accordance with claim 12, wherein
said first sorting means further includes:
(h) accompanying data providing means for providing said numerical data with respective accompanying data for associating each of said numerical data with respective corresponding ones of said first vector data; and
(i) a first vector data memory for sorting said first vector data in response to respective values of said accompanying data,
said writing and said reading are performed with respect to sets of said numerical data sand said accompanying data, and
said second vector data are generated by reading said first vector data from said first vector data memory in accordance with the sequence of said accompanying data upon completion of said repetition by n times.

14. An image data processing apparatus in accordance with claim 13, wherein
said values of said accompanying data are responsive to an input sequence of said first vector data, and
said first vector data are stored in respective memory spaces ordered in the same sequence as said input sequence within said first vector data memory.

15. An image data processing apparatus in accordance with claim 14, wherein
said recording through scanning is exposure recording on a photosensitive material,
said main scanning coordinate data of said intersection points are provided with flags indicating whether said intersection points are exposure start points or exposure end points, and
said image data generating means is run-length data generating means for obtaining run-length data on the basis of said main scanning coordinate values of said intersection points and said flags to output said run-length data as image data for said recording through scanning.

16. An image data processing apparatus in accordance with claim 15, wherein
said run-length data generating means includes:
accumulating means for sequentially accumulating said flags with respect to those having the same subscanning coordinate along the main scanning direction; and
means for obtaining differences between said main scanning coordinate values of said intersection points in response to the results of accumulation thereby to obtain said run-length data.

17. An image data processing apparatus in accordance with claim 11, wherein
calculation and output of said intersection points in said intersection point coordinate operating means are performed per partial region having a prescribed width in the subscanning direction.

18. An image data processing apparatus in accordance with claim 11, wherein
said first vector data includes the main scanning coordinate and the subscanning coordinate of a terminal point of said segment corresponding to a recording start point.

19. An image data processing apparatus in accordance with claim 11, wherein
said second sorting means performs radix sorting on the basis of said main scanning coordinate values of said intersection points.

20. An image data processing apparatus in accordance with claim 19, wherein
said main scanning coordinates of said intersection points are expressed as m-ary n-digit numerical values, and
said second sorting means includes:
a second plurality of memory blocks each having m storage regions each of which is capable of storing said main scanning coordinates;
second digit designating means for designating digits of said main scanning coordinates in an ascending sequence;
second memory block selecting means for alternately or cyclicly selecting a one of said second memory blocks per digit designated by said second digit designating means from said second plurality of memory blocks;
second write means for sequentially writing said main scanning coordinates in any of said storage regions of a selected one of said second memory blocks in response to the value of a digit designated by said second digit designating means within values of said main scanning coordinates;
second read means for reading said main scanning coordinates from said selected one of said second memory blocks in a sequence responsive to a subsequently designated digit;
second repeating means for repeating said writing and said reading n times in synchronization with a digit designation by said second digit designating means; and
second sequencing means for sequentially outputting said main scanning coordinates upon repetition of said writing and said reading by n times.

21. An image data processing apparatus for sequentially inputting coordinate values of intersection points of segments included in desired image patterns and main scanning lines along a direction of subscanning to provide image data for recording said image patterns through scanning on the basis of said coordinate values of said intersection points, said image data processing apparatus comprising:

sorting means for radix sorting values of said intersection points along a main scanning direction with respect to main scanning coordinate values and for outputting said main scanning coordinate values in accordance with a sequence permuted by said sorting; and image data generating means for obtaining image data on the basis of said main scanning coordinate values of said intersection points outputted from said sorting means to output said image data.

22. An image data processing apparatus in accordance with claim 21, wherein said main scanning coordinates of said intersection points are expressed as m-ary n-digit numerical values, and said sorting means includes:

a plurality of memory blocks each having m storage regions each of which is capable of storing said main scanning coordinates;

digit designating means for designating digits of said main scanning coordinates from a lower order;

memory block selecting means for alternately or cyclicly selecting a memory block per digit designated by said digit designating means from said plurality of memory blocks;

means for sequentially writing said main scanning coordinates in any of said storage regions of a selected memory block in response to the value of a digit designated by said digit designating means within said main scanning coordinate values;

read means for reading said main scanning coordinates from said selected memory block in a sequence responsive to a subsequently designated digit;

means for repeating said writing and said reading n times in synchronization with digit designation by said digit designating means; and means for sequentially outputting said main scanning coordinates upon repetition of said writing and said reading by n times.

23. An image data processing method of sequentially inputting first vector data expressing segments included in desired image patterns for providing image data for recording said image patterns through scanning on the basis of said first vector data, said recording through being performed by a combination of main scanning and subscanning, said segments having respective terminal points, said first vector data including respective main scanning coordinate and respective subscanning coordinate of said terminal points, said image data processing method comprising:

a first step of sequentially inputting said first vector data;

a second step of permuting said first vector data along said subscanning direction by performing radix sorting on said first vector data according to said subscanning coordinates, whereby said first vector data become second vector data permuted along said subscanning direction;

a third step of calculating coordinate values of intersection points of said segments and main scanning lines on the basis of said second vector data, said coordinate values including main scanning coordinate values and subscanning coordinates values;

a fourth step of sequentially outputting said main scanning coordinate values of said intersection points in sequence responsive to said subscanning coordinate values of said intersection points;

a fifth step of sorting said main scanning coordinate values of said intersection points along said subscanning direction;

a sixth step of outputting said main scanning coordinate values of said intersection points in sequence along said subscanning direction; and a seventh step of converting said main scanning coordinate values of said intersection points into image data including an information for discriminating between an inner region and an outer region of a composite pattern consisting of said image patterns, said image data being employable in said recording.

24. An image data processing method in accordance with claim 23, wherein said subscanning coordinate of said terminal point is expressed my m-ary n-digit numerical data, and said first step includes:

(a) a first process of designating digits of said numerical data in a sequentially increasing order;

(b) a second process of alternately or cyclicly selecting a memory block per designated digit from a plurality of memory blocks each having m storage regions capable of storing said numerical data;

(c) a third process of sequentially writing said numerical data in any of said storage regions of a selected memory block in response to the value of a designated digit within values of said numerical data;

(d) a fourth process of reading said numerical data from said selected memory block in sequence responsive to a subsequently designated digit;

(e) a fifth process of repeating said third and fourth processes n times in synchronization with said digit designation; and (f) a sixth process of sequencing said first vector data in accordance with a sequence of said numerical data upon repetition of said third and fourth processes by n times thereby to generate said second vector data and sequentially output the same.

25. An image data processing method in accordance with claim 24, wherein said first step further includes:

(g) a process of providing said numerical data with accompanying data for relating said numerical data with said first vector data in advance of said first process; and (h) an process of storing said first vector data in a first vector data memory in which addresses in said first data memory for storing said first vector data are designated by said accompanying data, said writing and said reading are performed with respect to sets of said numerical data and said accompanying data, and said second vector data are generated by reading said first vector data from said first vector data memory in accordance with a sequence of said accompanying data upon completion of said repetition by n times.

26. An image data processing method in accordance with claim 25, wherein
   said accompanying data have values responsive to a sequence of input of said first vector data, and
   said addresses are sequentially designated along said input sequence of said first vector data.

27. An image data processing apparatus for sequentially inputting first vector data expressing segments included in desired image patterns for providing image data for recording said image patterns through scanning on the basis of said first vector data, said recording through scanning being performed by a combination of main scanning and subscanning, said segments having respective terminal points, said first vector data including respective main scanning coordinates of said terminal points, said image data processing apparatus comprising:
   first sorting mean for permuting said first vector data along said subscanning direction by performing radix sorting of said first vector data according to said subscanning whereby said first vector data become second vector data permuted along said subscanning direction;
   intersection point coordinate calculating means for calculating coordinate values of intersection points of said segments and main scanning lines on the basis of said second vector data, said coordinate values including main scanning coordinate values and subscanning coordinate values;
   first output means for sequentially outputting said main scanning coordinate values of said intersection points in sequence responsive to subscanning coordinate values of said intersections points;
   second sorting means for sorting said main scanning coordinate values of said intersection points along said subscanning direction;
   second output means for outputting said main scanning coordinate values in sequence along said subscanning direction; and
   image data generating means for converting said main scanning coordinate values of said intersection points into image data including an information for discriminating between an inner region and an outer region of a composite pattern consisting of said image patterns, said image data being employed in said recording.

28. An image data processing apparatus in accordance with claim 27, wherein
   said main scanning coordinate of said terminal point is expressed by m-ary n-digit numerical data, and
   said first sorting means includes:
   (a) a plurality of first memory blocks each having m storage regions capable of sorting said numerical data;
   (b) first digit designating means for designating digits of said numerical data in and ascending order;
   (c) first memory block selecting means for alternately or cyclicly selecting a one of said first memory blocks per digit designated by said first digit designating means from said plurality of first memory blocks;
   (d) first write means for sequentially writing said numerical data in any of said storage regions of a selected one of said first memory blocks in response to the value of a digit designated by said first digit designating means within values of said numerical data;
   (e) first read means for reading said numerical data from said selected one of said first memory blocks in a sequence responsive to a subsequently designated digit;
   (f) first repeating means for repeating said writing and said reading n times in synchronization with a digit designation by said first digit designating means; and
   (g) first sequencing means for sequentially outputting said numerical data upon repetition of said writing and said reading by n times thereby to generate said second vector data and sequentially output the same.

29. An image data processing apparatus in accordance with claim 28, wherein
   said first sorting means further includes:
   (h) accompanying data providing means for providing said numerical data with accompanying data for relating said numerical data with said first vector said; and
   (i) a first vector data memory for storing said first vector data in which addresses in said first vector memory for storing said first vector data are designated by said accompanying data,
   said writing and said reading are performed with respect to sets of said numeral data sand said accompanying data, and
   said second vector data are generated by reading said first vector data from said first vector data memory in accordance with the sequence of said accompanying data upon completion of said repetition by n times.

30. An image data processing apparatus in accordance with claim 29, wherein
   said accompanying data have values responsive to an input sequence of said first vector data, and
   said first vector data are stored in addresses sequentially designated along said input sequence of said first vector data.

* * * * *